(12) United States Patent
Singh et al.

(10) Patent No.: US 10,509,640 B2
(45) Date of Patent: *Dec. 17, 2019

(54) ADD A NEW INSTANCE TO A SERIES

(71) Applicant: Microsoft Technology Licensing, LLC, Redmond, WA (US)

(72) Inventors: Jaskaran Singh, Redmond, WA (US); Dipak Sarjerao Pawar, Redmond, WA (US); Szymon Madejczyk, Sammamish, WA (US); Roberto Ribeiro da Fonseca Mendes, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,993

(22) Filed: Dec. 6, 2017

(65) Prior Publication Data
US 2018/0107471 A1 Apr. 19, 2018

Related U.S. Application Data

(63) Continuation of application No. 14/842,084, filed on Sep. 1, 2015, now Pat. No. 9,977,666.

(51) Int. Cl.
*G06F 9/445* (2018.01)
*G06F 8/65* (2018.01)
(Continued)

(52) U.S. Cl.
CPC .............. *G06F 8/65* (2013.01); *G06F 9/54* (2013.01); *G06F 11/1433* (2013.01); *H04L 51/046* (2013.01)

(58) Field of Classification Search
CPC .......... G06F 8/65; G06F 9/54; G06F 11/1433; H04L 51/046
See application file for complete search history.

(56) References Cited

U.S. PATENT DOCUMENTS

| 4,653,048 A | 3/1987 | Anderson et al. |
| 5,197,000 A | 3/1993 | Vincent |

(Continued)

FOREIGN PATENT DOCUMENTS

WO  9922324 A1  5/1999

OTHER PUBLICATIONS

Alexander Thayer et al., I Love You, Let's Share Calendars: Calendar Sharing as Relationship Work, ACM, 2012, retrieved online on Aug. 7, 2019, pp. 749-758. Retrieved from the Internet: <URL: http://delivery.acm.org/10.1145/2150000/2145317/p749-thayer.pdf?>. (Year: 2012).*

(Continued)

*Primary Examiner* — Hanh Thi-Minh Bui
(74) *Attorney, Agent, or Firm* — Workman Nydegger

(57) ABSTRACT

Adding an instance to a series in a fashion that preserves the series for both modern and legacy systems, even when the addition would not ordinarily be compatible with the legacy system. A method includes identifying a master message. The master message includes default values for events in the series. The method further includes identifying user input for a new event in the series. The user input identifies exceptions to the default values. The method further includes creating an instance message that includes default values from the master message for which there are no exceptions identified in the user input and includes the exceptions from the user input.

20 Claims, 15 Drawing Sheets

(51) Int. Cl.
*G06F 9/54* (2006.01)
*G06F 11/14* (2006.01)
*H04L 12/58* (2006.01)

(56) References Cited

U.S. PATENT DOCUMENTS

| | | | |
|---|---|---|---|
| 5,813,013 | A | 9/1998 | Shakib et al. |
| 5,905,863 | A | 5/1999 | Knowles et al. |
| 6,272,074 | B1 | 8/2001 | Winner |
| 7,016,909 | B2 | 3/2006 | Chan et al. |
| 7,108,173 | B1 | 9/2006 | Wang et al. |
| 7,343,312 | B2 | 3/2008 | Capek et al. |
| 7,370,282 | B2 | 5/2008 | Cary |
| 7,490,089 | B1 | 2/2009 | Georgiev |
| 7,499,942 | B2 | 3/2009 | Simison et al. |
| 7,743,098 | B2 | 6/2010 | Anglin et al. |
| 7,818,377 | B2 | 10/2010 | Whitney et al. |
| 7,865,872 | B2 | 1/2011 | Chamieh et al. |
| 8,495,656 | B2 | 7/2013 | Johnson et al. |
| 8,577,959 | B2 | 11/2013 | Pandey et al. |
| 8,612,876 | B2 | 12/2013 | Barnett et al. |
| 8,838,461 | B2 | 9/2014 | Beebe et al. |
| 8,850,330 | B2 | 9/2014 | Coppinger et al. |
| 8,924,269 | B2 | 12/2014 | Seubert et al. |
| 9,882,854 | B2 | 1/2018 | Singh et al. |
| 9,929,989 | B2 | 3/2018 | Singh et al. |
| 2003/0154116 | A1 | 8/2003 | Lofton |
| 2003/0225732 | A1 | 12/2003 | Chan et al. |
| 2003/0233265 | A1 | 12/2003 | Lee et al. |
| 2005/0192857 | A1 | 9/2005 | Levine |
| 2005/0222971 | A1 | 10/2005 | Cary |
| 2006/0031311 | A1 | 2/2006 | Whitney et al. |
| 2006/0200374 | A1 | 9/2006 | Nelken |
| 2007/0005409 | A1 | 1/2007 | Boss et al. |
| 2007/0079260 | A1 | 4/2007 | Bhogal et al. |
| 2007/0150503 | A1 | 6/2007 | Simison et al. |
| 2008/0114636 | A1 | 5/2008 | Nellutla |
| 2008/0147469 | A1 | 6/2008 | Murillo et al. |
| 2008/0168146 | A1 | 7/2008 | Fletcher |
| 2009/0018878 | A1 | 1/2009 | Baron et al. |
| 2009/0187814 | A1* | 7/2009 | Raff ..................... G06Q 10/109 715/205 |
| 2009/0248474 | A1 | 10/2009 | Fried et al. |
| 2010/0254389 | A1 | 10/2010 | Singh et al. |
| 2010/0257404 | A1 | 10/2010 | Singh et al. |
| 2010/0262926 | A1 | 10/2010 | Gupta et al. |
| 2011/0015961 | A1 | 1/2011 | Chan |
| 2011/0054976 | A1 | 3/2011 | Adler et al. |
| 2011/0202999 | A1 | 8/2011 | Logan et al. |
| 2011/0225015 | A1 | 9/2011 | Spivack et al. |
| 2011/0247017 | A1 | 10/2011 | Hopkins et al. |
| 2011/0307363 | A1 | 12/2011 | N et al. |
| 2011/0320237 | A1 | 12/2011 | Beaman et al. |
| 2012/0221369 | A1 | 8/2012 | Braatem et al. |
| 2012/0304088 | A1 | 11/2012 | Kho et al. |
| 2013/0055312 | A1 | 2/2013 | Cheng et al. |
| 2013/0067024 | A1 | 3/2013 | Vasters |
| 2013/0144672 | A1 | 6/2013 | Chakra et al. |
| 2013/0246526 | A1 | 9/2013 | Wu et al. |
| 2013/0290058 | A1 | 10/2013 | Gray et al. |
| 2013/0298043 | A1 | 11/2013 | Bailey |
| 2014/0172483 | A1 | 6/2014 | Bellers et al. |
| 2014/0229560 | A1 | 8/2014 | Gray |
| 2014/0278675 | A1 | 9/2014 | DeLuca et al. |
| 2014/0282005 | A1 | 9/2014 | Gutowitz |
| 2014/0310045 | A1 | 10/2014 | Meltzer et al. |
| 2015/0058425 | A1 | 2/2015 | Nathan et al. |
| 2016/0042324 | A1 | 2/2016 | Johnson et al. |
| 2016/0232495 | A1 | 8/2016 | Au et al. |
| 2016/0248803 | A1* | 8/2016 | O'Connell .......... G06F 16/2455 |
| 2016/0275456 | A1* | 9/2016 | Logtenberg .......... G06Q 10/109 |
| 2017/0060563 | A1 | 3/2017 | Singh et al. |
| 2017/0061388 | A1 | 3/2017 | Singh et al. |
| 2017/0063742 | A1 | 3/2017 | Singh et al. |
| 2017/0063743 | A1 | 3/2017 | Singh et al. |
| 2017/0063766 | A1 | 3/2017 | Singh et al. |

OTHER PUBLICATIONS

"Notice of Allowance Issued in U.S. Appl. No. 14/842,013", dated Feb. 1, 2018, 13 Pages.
"Notice of Allowance Issued in U.S. Appl. No. 14/842,013", dated Mar. 29, 2018, 5 Pages.
"Notice of Allowance Issued in U.S. Appl. No. 14/842,013", dated Feb. 16, 2018, 5 Pages.
"Notice of Allowance Issued in U.S. Appl. No. 14/842,013", dated Mar. 20, 2018, 5 Pages.
"Corrected Notice of Allowability Issued in U.S. Appl. No. 14/842,023", dated Dec. 13, 2017, 7 Pages.
"Corrected Notice of Allowance Issued in U.S. Appl. No. 14/842,023", dated Jan. 12, 2018, 5 Pages.
"Corrected Notice of Allowance Issued in U.S. Appl. No. 14/842,084", dated Apr. 12, 2018, 6 Pages.
"Non-Final Office Action Issued in U.S. Appl. No. 14/842,097", dated Mar. 13, 2018, 9 Pages.
"Corrected Notice of Allowance Issued in U.S. Appl. No. 14/842,023", dated Feb. 22, 2018, 5 Pages.
"Corrected Notice of Allowance Issued in U.S. Appl. No. 14/842,023", dated Jan. 30, 2018, 5 Pages.
"International Preliminary Report on Patentability Issued in PCT Application No. PCT/US2016/049344", dated Dec. 4, 2017, 13 Pages.
"International Preliminary Report on Patentability Issued in PCT Application No. PCT/US2016/049346", dated Dec. 12, 2017, 7 Pages.
"Corrected Notice of Allowance Issued in U.S. Appl. No. 14/842,036", dated Nov. 30, 2017, 4 Pages.
"International Preliminary Report on Patentability Issued in PCT Application No. PCT/US2016/049409", dated Nov. 14, 2017, 8 Pages.
"Before your Calendar Appointments are Migrated to the New Exchange Service", Retrieved From: <<http://reports.is.ed.ac.uk/areas/itservices/colltools/exseed/help-and-support/migrations/exchange-premigration.pdf>>, Jul. 10, 2015, 7 Pages.
"Create a Repeating Event", Retrieved From: <<https://web.archive.org/web/20130425080336/https://supportgoogle.com/calendar/answer/37115?hl=en#>>, Apr. 25, 2013, 2 Pages.
"How to: Create a Recurring Series by Using EWS in Exchange", Retrieved From: <<https://msdn.microsoft.com/en-us/library/office/dn727654%28v=exchg.150%29.aspx>>, Mar. 9, 2015, 5 Pages.
"Irregular Recurring Appointments and Meetings", Retrieved From: <<http://www.msoutlook.info/question/549>>, Jul. 7, 2011, 2 Pages.
"Irregular Recurring Meetings", Retrieved From: <<https://www.tru.ca/_shared/assets/irregular_recurring_meetings28463.pdf>>, Jul. 10, 2015, 2 Pages.
"Recurrence Patterns and EWS", Retrieved From: <<https://msdn.microsoft.com/en-us/library/office/dn727655(v=exchg.150).aspx>>, May 30, 2014, 7 Pages.
"Recurring Outlook Appointments with an Irregular Pattern", Retrieved From: <<https://web.archive.org/web/20140321164513/http://www.alandaletraining.com/free-tips/recurring-outlook-appointments-with-an-irregular-pattern>>, Mar. 21, 2014, 3 Pages.
"Web Ex Meeting Center User Guide", Retrieved From: <<https://www.cisco.com/c/dam/en/us/td/docs/collaboration/meeting_center/wx_mc_host_ug.pdf>>, Aug. 1, 2014, 414 Pages.
"Non-Final Office Action Issued in U.S. Appl. No. 14/842,023", dated Jul. 17, 2017, 8 Pages.
"Notice of Allowance in U.S. Appl. No. 14/842,023", dated Oct. 25, 2017, 17 Pages.
"Notice of Allowance in U.S. Appl. No. 14/842,036", dated Oct. 2, 2017, 23 Pages.
"Non-Final Office Action Issued in U.S. Appl. No. 14/842,084", dated Apr. 6, 2017, 19 Pages.
"Notice of Allowance in U.S. Appl. No. 14/842,084", dated Sep. 19, 2017, 19 Pages.
Borenstein, et al., "MIME (Multipurpose Internet Mail Extensions) Part One: Mechanisms for specifying and Describing the Format of Internet Message Bodies", Retrieved From: <<https://www.rfc-editor.org/rfc/rfc1521.txt>>, Sep. 1993, 81 Pages.

(56) References Cited

OTHER PUBLICATIONS

Glover, Ken, "Dealing with Documents for Irregularly Recurring Meetings", Retrieved From: <<http://words.usask.ca/sharepointsig/2012/04/13/dealing-with-documents-for-irregularly-recurring-meetings/>>, Apr. 13, 2012, 6 Pages.

Hollington, Jesse, "Scheduling Irregularly Recurring Events", Retrieved From: <<https://web.archive.org/web/20121022013350/http://www.ilounge.com/index.php/articles/comments/scheduling-irregularly-recurring-events>>, Oct. 19, 2012, 5 Pages.

Konstantinos, et al., "Activity Ontologies for Intelligent Calendar Application", In Proceedings of the 7th Balkan Conference on Informatics Conference, Sep. 2, 2015, 8 Pages.

Lefkovics, William, "How can I establish Recurring Meetings with Variations in Microsoft Outlook?", Retrieved From: <<http://windowsitpro.com/outlooklq-how-can-i-establish-recurring-meetings-variations-microsoft-outlook>>, Sep. 29, 2011, 3 Pages.

Linthicum, David S., "Enterprise Application Integration; Chapter 13: Message brokers and 828 Application Integration", May 1, 2000, pp. 231-236.

Microsoft, "Calendars and EWS in Exchange", Retrieved From: <<https://msdn.microsoft.com/en-us/library/office/dn495623(v=exchg.150).aspx>>, Mar. 9, 2015, 2 Pages.

"How to: Access a recurring series by using EWS in Exchange", Retrieved From <<https://msdn.microsoft.com/en-us/library/office/dn643672(v=exchg.150).aspx>>, Mar. 9, 2015, 4 Pages.

"How to: Update a Recurring Series by Using EWS", Retrieved From <<https://msdn.microsoft.com/en-us/library/office/dn727657%28v=exchg.150%29.aspx>>, May 7, 2014, 3 Pages.

"How to: Update a Recurring Series by using EWS in Exchange", Retrieved From <<https://msdn.microsoft.com/en-us/library/office/dn727656%28v=exchg.150%29.aspx>>, May 30, 2014, 4 Pages.

"Mailbox synchronization and EWS in Exchange", Retrived From: <<https://msdn.microsoft.com/en-us/library/office/dn440952(v=exchg.150).aspx>>, Mar. 9, 2015, 4 Pages.

"Notification subscriptions, mailbox events, and EWS in Exchange", Retrieved From: <<https://msdn.microsoft.com/en-us/library/office/dn458791(v=exchg.150).aspx>>, Mar. 9, 2015, 4 Pages.

"Recurrence patterns and EWS Learn about recurrence patterns and recurring series in Exchange", Retrieved From <<https://msdn.microsoft.com/en-us/library/office/dn727655%28v=exchg.150%29.aspx>>, Mar. 9, 2015, 6 Pages.

Nomura, et al., "A Practical Calendaring System Conforming with Ambiguous Pattern of Recurring Tasks", In Proceedings of 14th International Conference on Network-Based Information Systems, Sep. 7, 2011, pp. 553-558.

"International Search Report and Written Opinion Issued in PCT Application No. PCT/US2016/049344", dated Dec. 7, 2016, 17 Pages.

"Second Written Opinion Issued in PCT Application No. PCT/US2016/049344", dated Sep. 6, 2017, 13 Pages.

"International Search Report and Written Opinion Issued in PCT Application No. PCT/US2016/049346", dated Oct. 24, 2016, 11 Pages.

"Second Written Opinion Issued in PCT Application No. PCT/US2016/049346", dated Aug. 17, 2017, 6 Pages.

"International Preliminary Report on Patentability Issued in PCT Application No. PCT/US2016/049347", dated Sep. 29, 2017, 8 Pages.

"International Search Report and Written Opinion Issued in PCT Application No. PCT/US2016/049347", dated Nov. 30, 2016, 11 Pages.

"Second Written Opinion Issued in PCT Application No. PCT/US2016/049347", dated Mar. 6, 2017, 6 Pages.

"International Preliminary Report on Patentability Issued in PCT Application No. PCT/US2016/049348", dated Oct. 13, 2017, 7 Pages.

"International Search Report and Written Opinion Issued in PCT Application No. PCT/US2016/049348", dated Jan. 24, 2017, 16 Pages.

"Second Written Opinion Issued in PCT Application No. PCT/US2016/049348", dated May 12, 2017, 7 Pages.

"International Search Report and Written Opinion Issued in PCT Application No. PCT/US2016/049409", dated Nov. 10, 2016, 12 Pages.

"Second Written Opinion Issued in PCT Application No. PCT/US2016/049409", dated Jun. 23, 2017, 7 Pages.

Sen, et al., "Satisfying User Preferences while Negotiating Meetings", In International Journal of Human-Computer Studies, vol. 47, Issue 3, Sep. 1997, 34 Pages.

Ross, Smith IV, "Exchange Server 2016 Architecture", Retrieved From <<https://blogs.technet.microsoft.com/exchange/2015/05/05/exchange-server-2016-architecture/>>, May 5, 2015, 10 Pages.

"Non-Final Office Action Issued in U.S. Appl. No. 14/842,013", dated Jul. 25, 2017, 8 Pages.

"Non-Final Office Action Issued in U.S. Appl. No. 14/842,036", dated Apr. 17, 2017, 15 Pages.

"Notice of Allowance Issued in U.S. Appl. No. 14/842,084", dated Dec. 18, 2017, 2 Pages.

"Office Action Issued in European Patent Application No. 16760361.2", dated Sep. 12, 2019, 7 Pages.

* cited by examiner

|  | Monday | Tuesday | Wednesday | Thursday | Friday |
|---|---|---|---|---|---|
| 10 AM | Metadata for the Series ||||  |
| 11 AM |  |  |  | 212 |  |
| 12 PM | Instance |  | Instance |  |  |
| 1 PM | 216-1 |  | 216-2 | Instance |  |
| 2 PM |  |  |  | 216-3 |  |

*Figure 8*

ADD A NEW INSTANCE TO A SERIES

CROSS REFERENCE TO RELATED APPLICATION

This application is a continuation of U.S. patent application Ser. No. 14/842,084, filed Sep. 1, 2015, and entitled "ADD A NEW INSTANCE TO A SERIES," the entire contents of which are incorporated by reference herein in their entirety.

BACKGROUND

Background and Relevant Art

Computers and computing systems have affected nearly every aspect of modern living. Computers are generally involved in work, recreation, healthcare, transportation, entertainment, household management, etc.

As computer technology advances, new features may be added to new (referred to herein as modern) versions of existing systems. As these features are added, there may be older (referred to herein as legacy) versions of the existing systems that are not able to natively implement the new features. However users of these legacy versions of systems may wish to take advantage the new features in the modern versions of the systems.

For example, modern versions of scheduling systems (such as the calendar functionality included in Microsoft Exchange Server and Microsoft Outlook client available from Microsoft Corporation of Redmond, Wash.) may include functionality that allows advanced scheduling features, such as the ability to have exceptions for appointments in a series of appointments, modify individual appointments in a series of appointments, add additional appointment instances to a series of appointments, collaborate on appointment details, etc. In some situations a server may have this functionality enabled and modern clients can make use of the functionality while legacy clients are unable to make use of the functionality, even though the server supports it. While some legacy systems allow for some of this functionality as well, later changes to a series will destroy any exceptions. This can create difficulties for users of both the modern clients and the legacy clients. In particular, a user at a modern client may utilize some of the functionality of the modern server and expect other users, including users at legacy clients, to be aware of the utilization. For example, a user at a modern client may update an instance of a series of appointments. Other users using modern clients would be made aware of the update, but users on legacy clients may not be made aware of the update, or may be made aware of the update in a way that breaks the series of appointments as a series. It would be useful to implement systems where modern and legacy clients could both implement new functionality and still be able to interact with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment including a series of events. The method includes acts for adding an instance to the series in a fashion that preserves the series for both modern and legacy systems, even when the addition would not ordinarily be compatible with the legacy system. The system includes identifying a master message. The master message includes default values for events in the series. The method further includes identifying user input for a new event in the series. The user input identifies exceptions to the default values. The method further includes creating an instance message that includes default values from the master message for which there are no exceptions identified in the user input and includes the exceptions from the user input.

Another embodiment illustrated herein includes a method that may be practiced in a computing environment including a series of events. The method includes acts for changing an instance to the series in a fashion that preserves the series for both modern and legacy systems, even when the change would not ordinarily be compatible with the legacy system. The system includes identifying a master message. The master message includes default values for events in the series. The method further includes identifying user input for an existing event in the series. The user input identifies exceptions to the default values. The method further includes creating an instance message that includes default values from the master message for which there are no exceptions identified in the user input and includes the exceptions from the user input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 8 illustrates a calendar view;

DETAILED DESCRIPTION

Figure 1A:
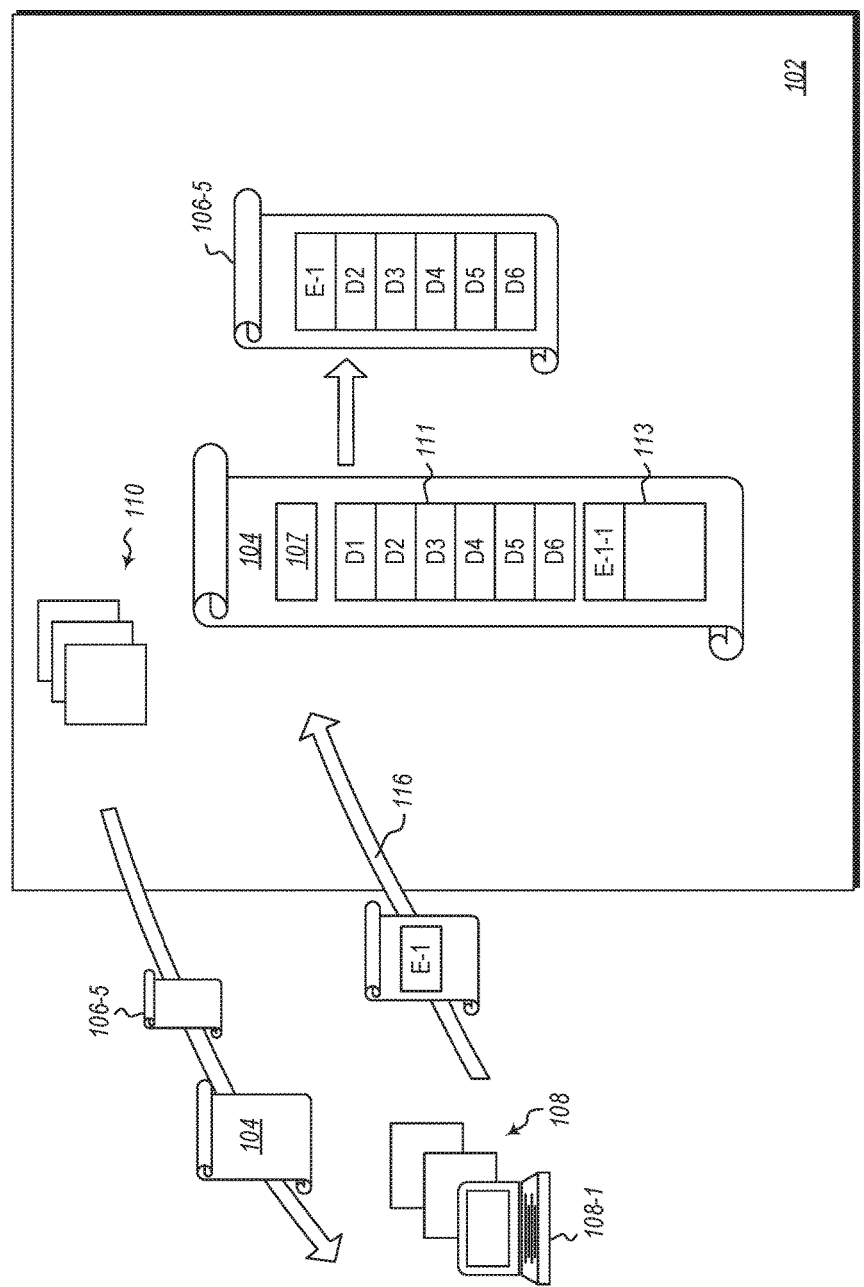
FIG. 1A illustrates a server configured to add new events to a series.

Modern calendaring systems have a notion of recurring meetings in which a user can define a pattern. For example, typically a user can define a calendar event to occur daily, weekly, monthly, or yearly. This functionality has existed for quite some time in calendaring systems whereby the systems determine, by following various rules, when items should be placed on a calendar. The recurrences can be limited to some user defined time frame or in some cases perpetual. Typically, a series of events are contained in a single message delivered by a calendaring server which can be understood by clients of the calendaring server.

Previously, users have not been able to add individual instances in the series. Or, if a user could add an individual instance, later when a change is made to the series itself, the additional will be lost. Thus, for example, a series may have a meeting scheduled with a default value of every Tuesday at 11:00 AM. A change may be made to the series to add one additional meeting at 10:00 AM on a particular Monday. Later, the series may be changed to have the default value be at 12:00 PM on Tuesdays. In some legacy systems, this would cause the extra instance to be lost, if it could have been added at all, and all meetings to be at 12:00 PM.

Further, previously, users have been able to modify individual instances in the series, but with some risk that those modifications will be lost. For example, a user may modify an individual instance, but later when a change is made to the series itself, the modification will be lost. Thus, for example, a series may have a meeting scheduled with a default value of every Tuesday at 11:00 AM. A change may be made to the series to have one series exception instance of the meeting at 10:00 AM. Later, the series may be changed to have the default value be at 12:00 PM. In legacy systems, this would cause the exception information to be lost, and all meetings to be at 12:00 PM.

However, a modern calendaring system has implemented functionality where non-pattern recurrence can be combined with the recurring model to have the ability to add extra instances of events that do not meet the defined recurrence pattern and to be persisted. For example, a series may be for a weekly meeting at 11:00 AM every Tuesday. There may be a desire to add one additional meeting at 10:00 AM on a particular Monday. When the series is later changed to have the default value of the meeting be at 12:00 PM, the new instance at 10:00 AM on a particular Monday will not be lost. Users of legacy systems may wish to take advantage of this functionality as well. The following illustrates how this is accomplished by embodiments described herein.

Further, a modern calendaring system has implemented functionality where non-pattern recurrence can be combined with the recurring model to have instances of events that do not meet the defined recurrence pattern be persisted. For example, embodiments may allow for having two instances on the same day, moving exceptions across instance boundaries, etc., and for these exceptions to be persisted even when changes are made to default values. For example, a series may be for a weekly meeting at 11:00 AM every Tuesday. There may be a desire to update one of the meetings to a series exception instance of Wednesday at 3:00 PM. When the series is later changed to have the default value of the meeting be at 12:00 PM, the series exception instance at Wednesday at 3:00 PM will not be lost. Users of legacy systems may wish to take advantage of this functionality as well. The following illustrates how this is accomplished by embodiments described herein.

One embodiment illustrated herein is able to persist new instance information for legacy systems by creating an instance message when a new instance is added to a series.

For example, FIG. 1A illustrates a modern server 102. The modern server 102 is able to handle a series with non-pattern recurrences and persist any non-pattern recurrences when default values are changed for the entire series. Such functionality is illustrated below for reference and understanding, however, it should be appreciated that embodiments may be implemented in other contexts.

FIG. 1A illustrates a master message 104. The master message 104, includes a view 107, default information 111, and exception information 113.

The view 107 defines a graphical view of calendar items to be displayed on a calendar user interface at a client such as one of the clients 108. This may define graphically how and where events on a calendar may be placed on the graphical user interface at a client. This may include information for all instances in a series such that a client can use the view 107 to graphically render all instances in a given series. This information can be used by legacy clients or modern clients to render events on a calendar. The view 107 can include exceptional view items as well which are readable by both modern and legacy clients.

The default information 111 includes default values for instances in the series. For example, a given default value may include a meeting location, a list of attendees, a default day, a default time, or other default value. These default values are used for any instances in the series in which there are no exceptions. The default information is viewable by both legacy and modern systems.

The exception information 113 identifies any exception values to default values for a given instance. Thus, for example, an exception may identify that the first instance in a series occurs on a Wednesday instead of a Tuesday. Alternatively, the exception information 113 may identify that an extra instance in the series exists, and details about the extra instance. In some embodiments, the exception information may be included specifically in the master message 104 while in other embodiments, the exception information may be included by virtue of pointers to locations where the actual exception values are stored. In the illustrated example, the exception information 113 is persistable and readable for modern systems, but may not be for legacy systems.

Embodiments herein can create individual instance messages readable by legacy systems that can supersede and/or replace exceptions noted in the master message 104. In particular, the embodiments herein are able to receive user input adding an instance in a series, and as a result create an instance message that is readable by a legacy client. The instance message can be maintained separately, such that updates to default items do not destroy the instance message, and thus, the exception for a particular instance can be maintained.

For example, FIG. 1A illustrates that the server 102 receives a user message 116-1 from a client 108-1. The user message 116-1 includes an exception value E1 that is an exception value for a new instance in a series. For example, assuming a series of four instances, the exception value E1 may be meant to add a new instance and replace the default value D1 for the new instance in the series. The other instances would retain the default value D1. All instances, assuming no other exceptions, would retain the other default values D2, D3, D4, D5 and D6. The client 108-1 can be a legacy client or a modern client. At the server 102, the server 102 updates the master message 104 to include the exception E1 in the exception information 113. However, the default value D1 is still retained for use by other existing instances in the series.

The server also creates a new instance message 106-5. The instance message 106-5 includes the exception value E1 as well as the default values D2, D3, D4, D5 and D6. The view 107 can be updated as needed as well.

As noted above, in some embodiments, the exception value E1 can be included in the master message 104 by using a pointer. In some embodiments, this may be done by using a pointer directly to the exception value E1 in the instance message 106-5. This can be done to conserver storage space at the server 102.

The master message 104 and instance message 106-5 can then be sent to the clients 108 that are interested in the series. Any modern clients in the clients 108 can use the master message to update the series with the instance exception by reading the exception information 113 and will not need the instance message 106-5, except insofar as the master message 104 points to values in the instance message 106-5. The modern clients will not use the default values from the instance message 106-5, but rather can use default values from the master message 104.

In some embodiments, the master message 104 and any instance messages can be sent to the clients 108 by placing the messages in mailboxes 110 for the clients 108.

Legacy clients use information from the instance messages 106 while modern clients obtain default information from the master message 104 and exception information from the instance messages 106 (or alternatively from the master message 104, if such information exists in the master message).

As will now be illustrated, the instance message 106-5 can be used to persist the exception value E1, even when changes are made to the series as a whole.

Figure 1B:
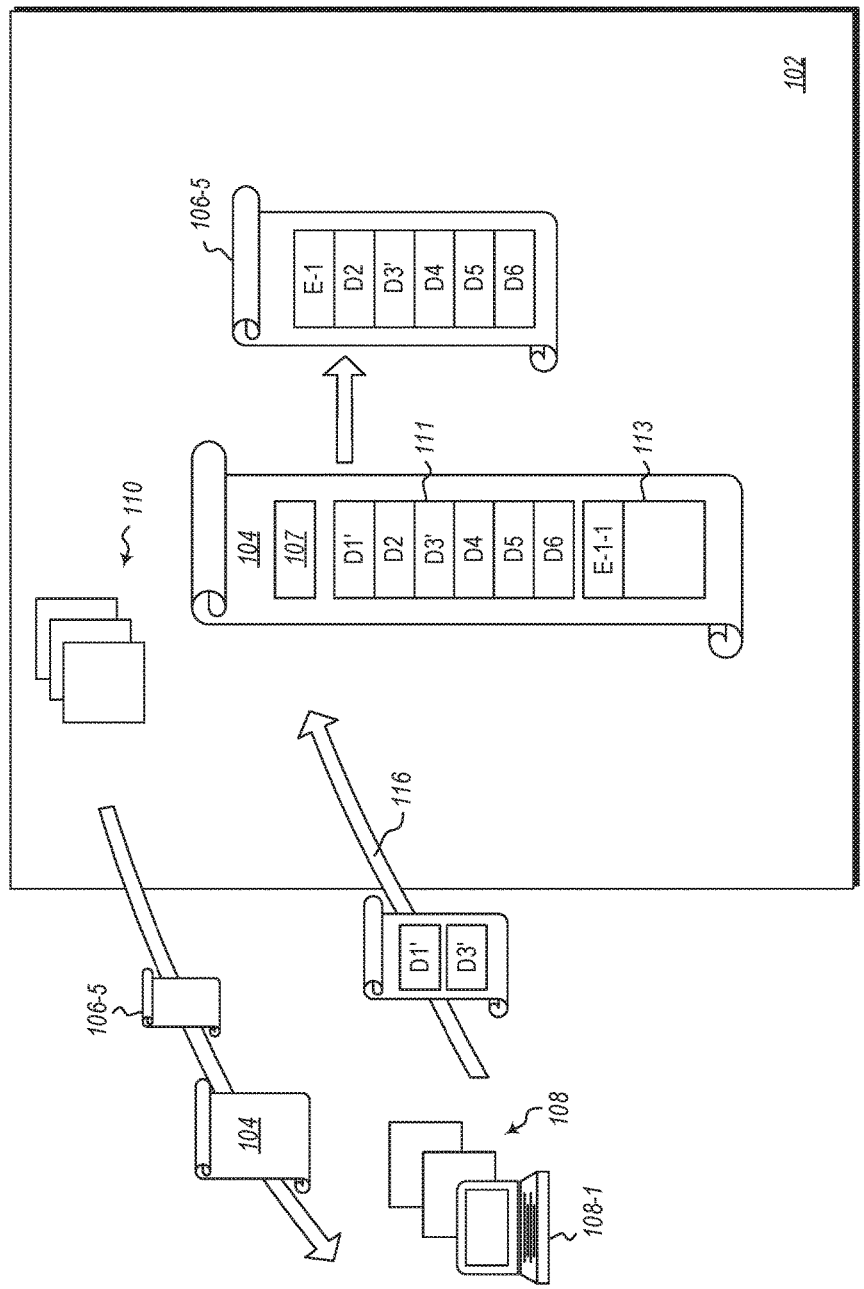
FIG. 1B illustrates additional details regarding the server configured to add new events to a series.

For example, FIG. 1B illustrates an example where the client 108-1 sends a user change message 116 that is intended to update the default value D1 to D1' and D3 to D3'. In this example, the server recognizes that this update is an update to the entire series and not just an update to a particular instance in the series. Thus, the server 102 will update the master message 104 to replace the value D1 with the value D1' and the value D3 with the value D3'. Because the instance message 106-6 already has an exception value E1 to D1 the instance message 106-5 will not be updated with the value of D1'. However, because the instance message 106-5 includes the default value D3, the instance message 106-5 will be updated to include the default value D3' in place of the default value D3. These messages, once updated, can then be propagated to the clients 108, where the clients 108 can use them to update series information at the clients as illustrated above.

One embodiment illustrated herein is able to persist exception information for legacy systems by creating an instance message when an instance in a series is updated to change a value for the instance from a default value to an exception value for the instance.

Figure 1C:
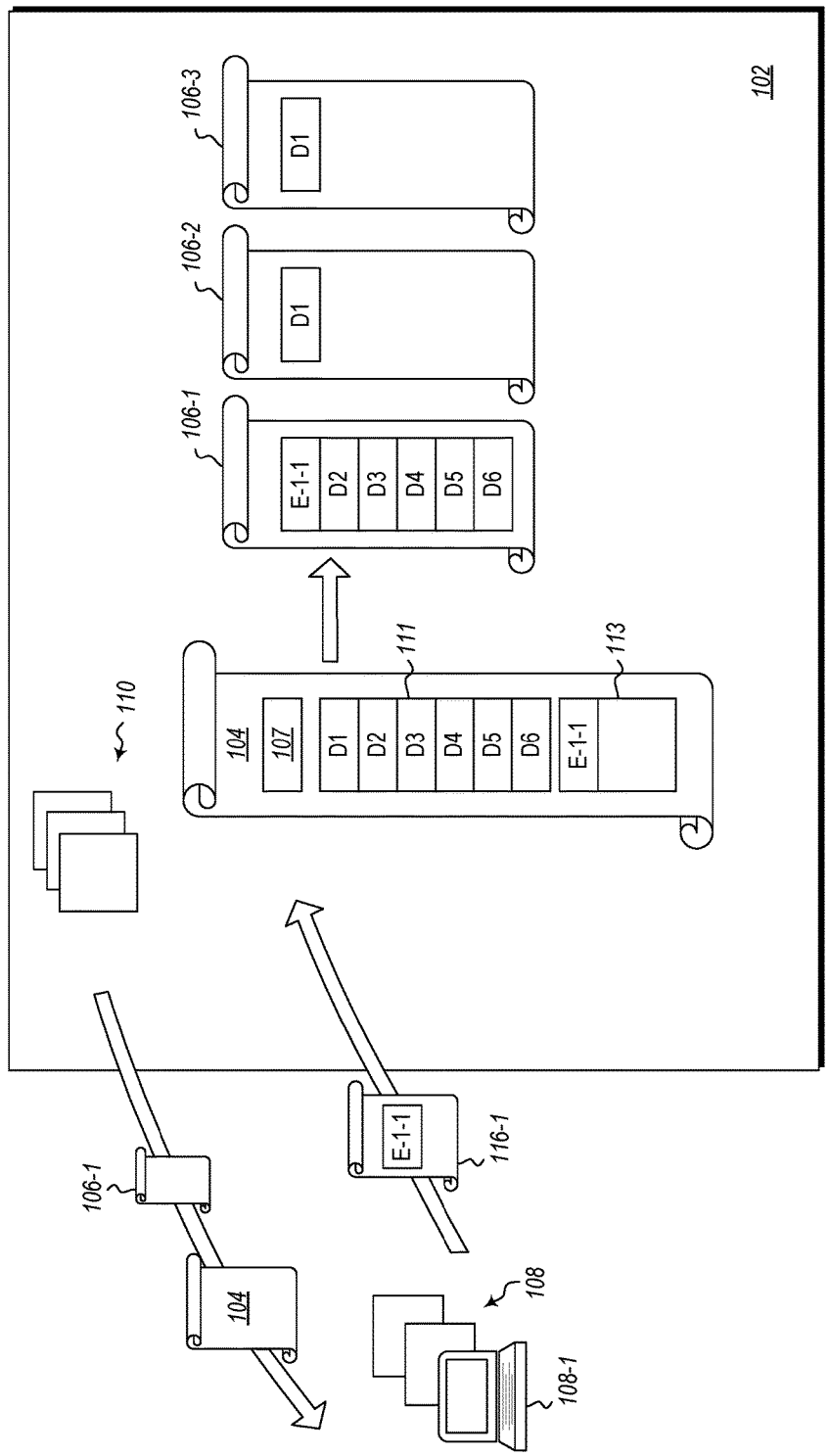
FIG. 1C illustrates a server configured to update existing events in a series.

For example, FIG. 1C illustrates a modern server 102. The modern server 102 is able to handle a series with non-pattern recurrences and persist any non-pattern recurrences when default values are changed for the entire series. Such functionality is illustrated below for reference and understanding, however, it should be appreciated that embodiments may be implemented in other contexts.

FIG. 1C illustrates a master message 104. The master message 104, includes a view 107, default information 111, and exception information 113.

The view 107 defines a graphical view of calendar items to be displayed on a calendar user interface at a client such as one of the clients 108. This may define graphically how and where events on a calendar may be placed on the graphical user interface at a client. This may include information for all instances in a series such that a client can use the view 107 to graphically render all instances in a given series. This information can be used by legacy clients or modern clients to render events on a calendar. The view 107 can include exceptional view items as well which are readable by both modern and legacy clients.

The default information 111 includes default values for instances in the series. For example, a given default value may include a meeting location, a list of attendees, a default day, a default time, or other default value. These default values are used for any instances in the series in which there are no exceptions. The default information is viewable by both legacy and modern systems.

The exception information 113 identifies any exception values to default values for a given instance. Thus, for example, an exception may identify that the first instance in a series occurs on a Wednesday instead of a Tuesday. In some embodiments, the exception information may be included specifically in the master message 104 while in other embodiments, the exception information may be included by virtue of pointers to locations where the actual exception values are stored. In the illustrated example, the exception information 113 is persistable and readable for modern systems, but not for legacy systems.

Embodiments herein can create individual instance messages readable by legacy systems that can supersede and/or replace exception noted in the master message 104. In particular, the embodiments herein are able to receive user input changing an instance in a series, and as a result create an instance message that is readable by a legacy client. The instance message can be maintained separately, such that updates to default items do not destroy the instance message, and thus, the exception for a particular instance can be maintained.

For example, FIG. 1C illustrates that the server 102 receives a user change message 116-1 from a client 108-1. The user change message 116-1 includes an exception value E1-1 that is an exception value that replaces the default value D1 for one instance in a series. For example, assuming a series of four instances, the exception value E1-1 may be meant to replace the default value D1 for the first instance in the series. The other instances would retain the default value D1. All instances, assuming no other exceptions, would retain the other default values D2, D3, D4, D5 and D6. The client 108-1 can be a legacy client or a modern client. At the server 102, the server 102 updates the master message 104 to include the exception E1-1 in the exception information 113. However, the default value D1 is still retained for use by other instances in the series.

The server also creates a new instance message 106-1. The instance message 106-1 includes the exception value E1-1 as well as the default values D2, D3, D4, D5 and D6. The view 107 can be updated as needed as well.

As noted above, in some embodiments, the exception value E1-1 can be included in the master message 104 by using a pointer. In some embodiments, this may be done by using a pointer directly to the exception value E1-1 in the instance message 106-1. This can be done to conserver storage space at the server 102.

The master message 104 and instance message 106-1 can then be sent to the clients 108 that are interested in the series. Any modern clients in the clients 108 can use the master message to update the series with the instance exception by reading the exception information 113 and will not need the instance message 106-1, except insofar as the master message 104 points to values in the instance message 106-1. The modern clients will not use the default values from the instance message 106-1

In some embodiments, the master message 104 and any instance messages can be sent to the clients 108 by placing the messages in mailboxes 110 for the clients 108.

Legacy clients use information from the instance messages 106 while modern clients obtain default information from the master message 104 and exception information from the instance messages 106 (or alternatively from the master message 104, if such information exists in the master message). As will now be illustrated, the instance message 106-1 can be used to persist the exception value E1-1, even when changes are made to the series as a whole.

Figure 1D:
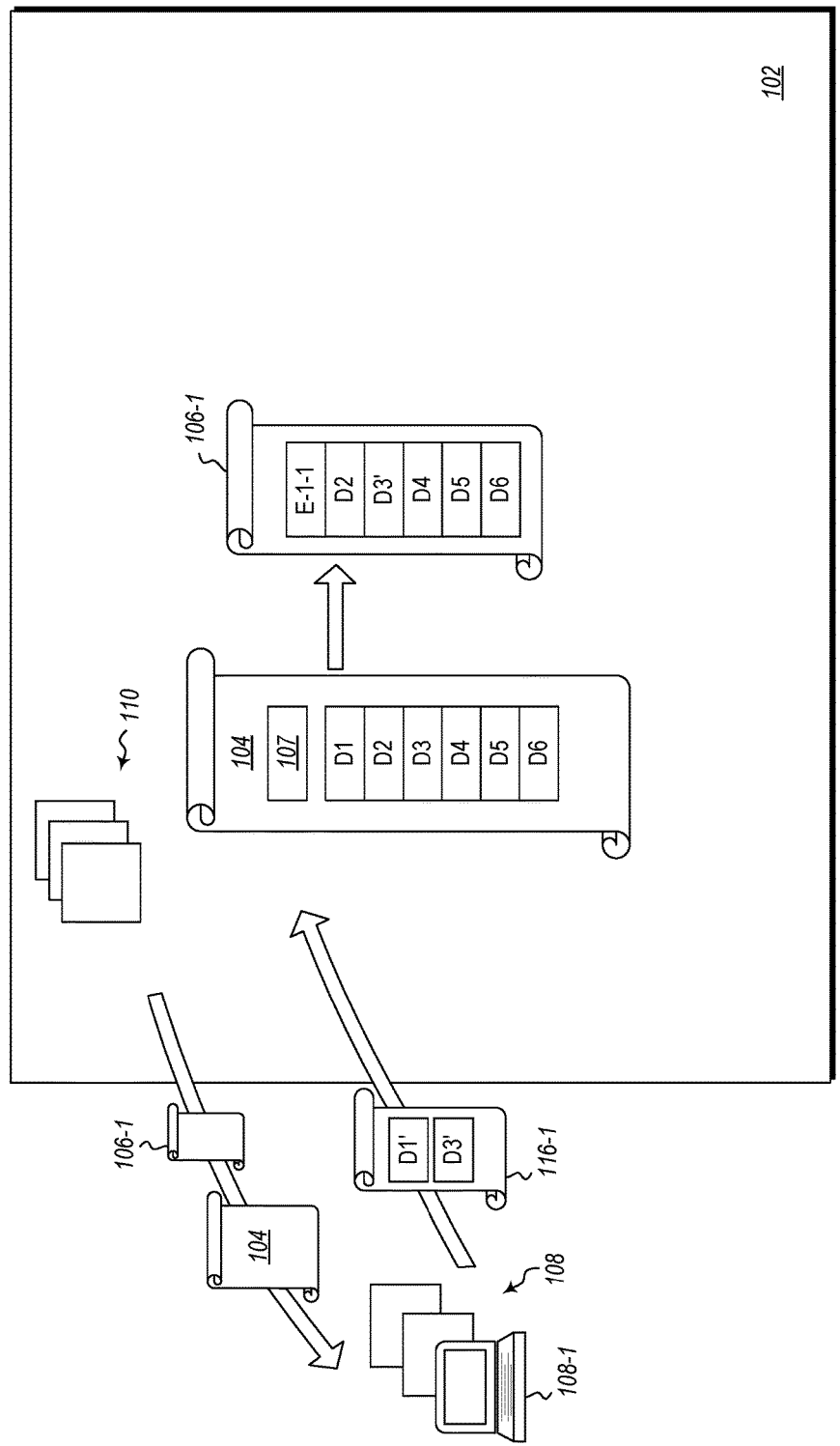
FIG. 1D illustrates additional details regarding the server configured to update existing events in a series.

For example, FIG. 1D illustrates an example where the client 108-1 sends a user change message 116 that is intended to update the default value D1 to D1' and D3 to D3'. In this example, the server recognizes that this update is an update to the entire series and not just an update to a particular instance in the series. Thus, the server 102 will update the master message 104 to replace the value D1 with the value D1' and the value D3 with the value D3'. Because the instance message 106-1 already has an exception value E1-1 to D1 the instance message 106-1 will not be updated with the value of D1'. However, because the instance message 106-1 includes the default value D3, the instance message 106-1 will be updated to include the default value D3' in place of the default value D3. These messages, once updated, can then be propagated to the clients 108, where the clients 108 can use them to update series information at the clients as illustrated above.

Figure 1E:
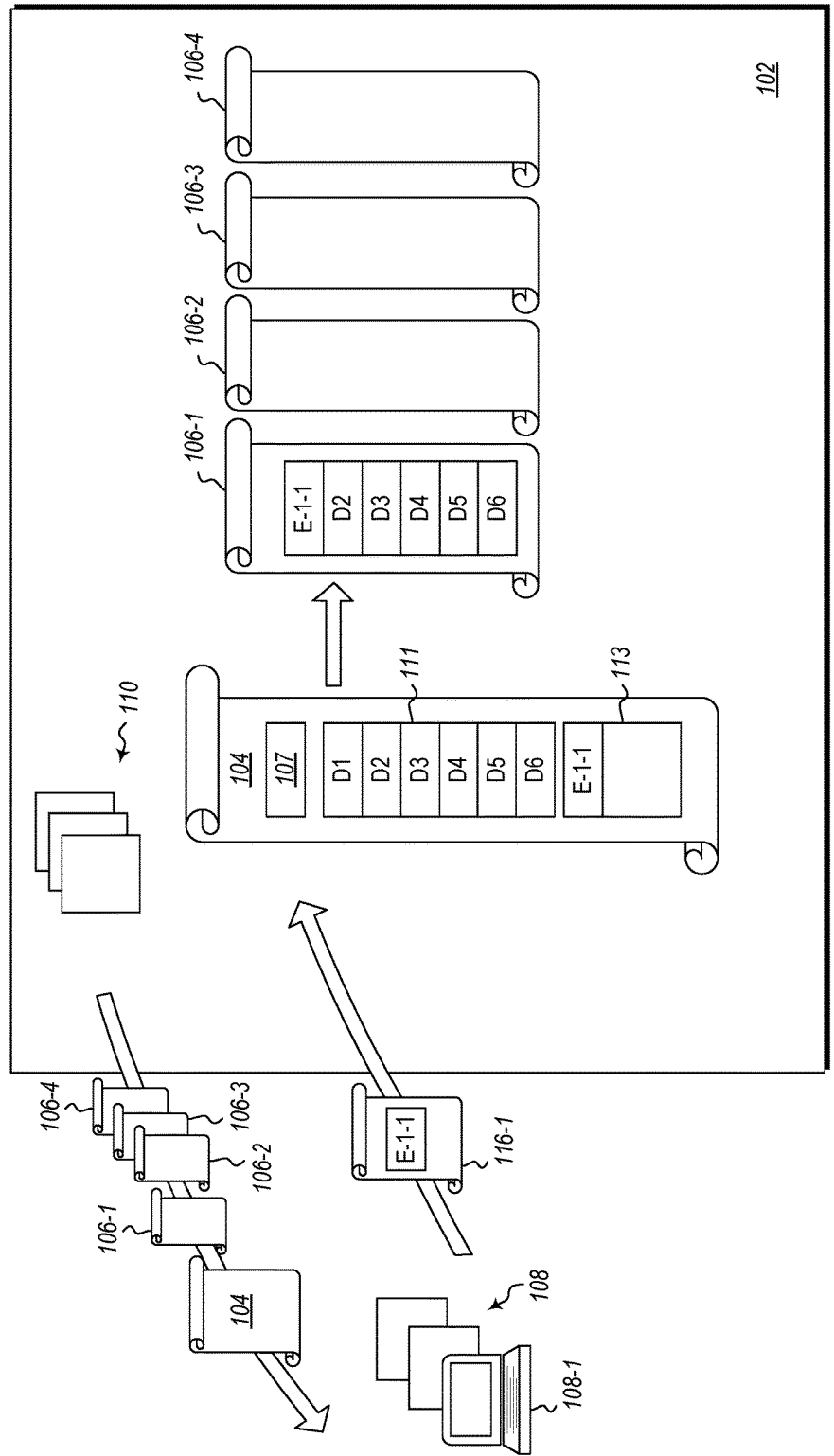
FIG. 1E illustrates additional details regarding the server configured to update existing events in a series

Referring now to FIG. 1E, additional details are illustrated. FIG. 1E illustrates that in the present example, it may be possible to create as many as four instance message 106-1, 106-2, 106-3 and 106-4 as there are four instances in the example series. Each instance message can contain any exceptions for its corresponding instance as well as any unchanged default values for the particular instance.

Some embodiments herein may be implemented using a master message and a set of instance messages for a series of messages. The master message stores all of the default values for the series of messages. The instance messages store any exceptions to the default values. It may be desirable to apply the default values to the instance messages for any values that are not exception values. This may be particularly true when a default value is updated and that update needs to be propagated to the instance messages. Thus, embodiments may apply the same operation to a number of distinct items, in this case, messages. In some embodiments, the messages may be calendar items, and the series of messages may be a series of recurring calendar items.

The following illustrates examples of propagating values to instance messages.

Some embodiments herein may be implemented using a master message and a set of instance messages for a series of messages. The master message stores all of the default values for the series of messages. The instance messages store any exceptions to the default values. It may be desirable to apply the default values to the instance messages for any values that are not exception values. This may be particularly true when a default value is updated and that update needs to be propagated to the instance messages. Thus, embodiments may apply the same operation to a number of distinct items, in this case, messages. In some embodiments, the messages may be calendar items, and the series of messages may be a series of recurring calendar items.

Figure 2A:
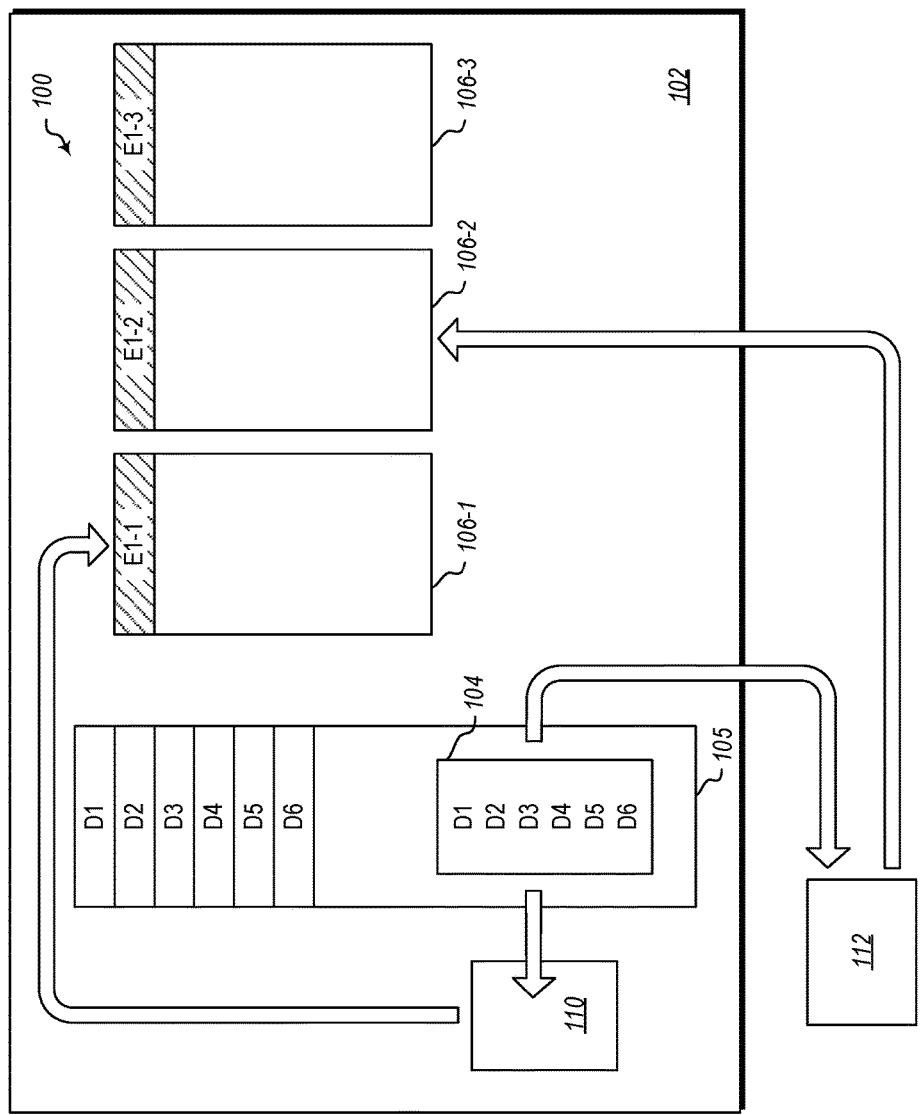
FIG. 2A illustrates a server and system for propagating values from a master message to instance messages.

Referring now to FIG. 2A, an example is illustrated. FIG. 2 illustrates a series 100 of messages. The series 100 of messages includes a master message 104 and a set of instance messages 106-1, 106-2 and 106-3. The master message 104 includes a plurality of default values D1, D2, D3, D4, D5, and D6. In the example where the series 100 of messages are calendar items, these values might include values defining dates, times, meeting attendees, locations, etc.

FIG. 2A further illustrates the instance messages 106-1, 106-2 and 106-3. While three instance messages are shown, it should be appreciated that any appropriate number of messages may be used. These instance messages include exceptions to the default values in the master message 104. For example, instance message 106-1 is shown with an exception value E1-1, instance message 106-2 is shown with an exception value E1-2, and instance message 106-3 is shown with an exception value E1-3. The exception values in the instance messages may modify and/or replace the default values in the master message 104. Thus, for example, D1 may be a date. E1-1, E1-2, and E1-3 may be different dates.

Embodiments may wish to apply any default values from the master message 100 that are not superseded by exception values to the instance messages 106-1, 106-2 and 106-3. Thus, in the illustrated example, the default values D2 through D5 may need to be applied to the instance messages 106-1, 106-2 and 106-3. Various operations may be performed to apply the default values D2 through D5 to the instance messages.

Thus, in this example, the same operation(s) needs to be applied to a number of distinct items, in this example, messages. Embodiments may have a command queue 105 in which the command to perform an operation is logged. In this example shown in FIG. 2A, the command queue 105 is included in the master message 104. Thus, in the example, for non-pattern recurrence embodiments (as discussed in more detail below), there is a command queue 105 on each series master (e.g., master message 104) which is used to store any series level updates. These need to be applied, in the order they appear on the queue, to each instance message 106 to facilitate interoperability with legacy clients. While the examples here illustrate the command queue 105 on each master message 104, in other embodiments, the command queue 105 may be stored in other locations and associated with the master message 104.

In the illustrated example, there are two mechanisms configured to apply update commands from the command queue 105 to the instance messages, namely an in-line tool 110 and a background service 112 which will apply the command. On a series update, a command is queued up by the in-line tool 110 which tries to apply the command to each individual instance message 106. The in-line tool 110 may be, for example, an application programming interface (API) on a server 102. For example, the server 102 may be a calendaring system such as the calendaring system available in Exchange Server available from Microsoft Corporation of Redmond, Wash.

Figure 2B:
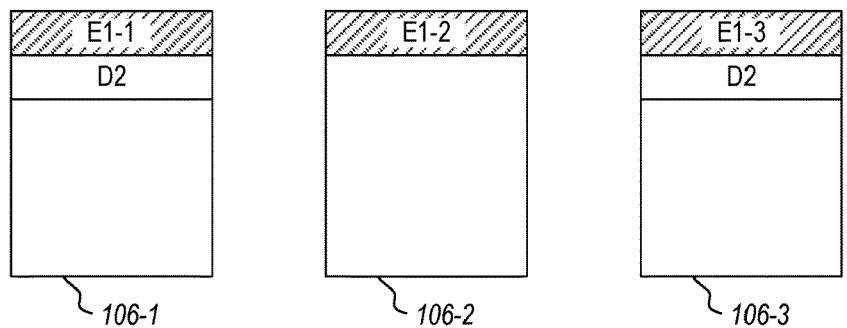
FIG. 2B illustrates instance messages being updated.

A call to the in-line tool 110 may be terminated due to system failure, operating errors, or for some other reason, in between when the call to the in-line tool 110 is made and when updates have been applied to instance messages. However, as noted, embodiments may include a background service 112 which obtains commands from the command queue 105 and applies these commands to the instance messages 106 in concert with the in-line tool 110. As the background service 112 is running independently of the in-line tool 110, there could be a race condition with the inline tool 110. Additionally or alternatively, resources may be wasted when the background service 112 first checks to see if a particular command has already been applied to each instance message 106. To optimize on both of these, embodiments may be configured to have the background service 112 apply commands from the command queue 105 to the instance messages 106-1, 106-2 and 106-3 in reverse order with respect to the order used by the in-line tool 110. For example, if the instance messages 106-1, 106-2 and 106-3 are ordered, e.g. ordered by their start times, then the inline tool is configured to update 106-1, then 106-2, and then 106-3. Contemporaneously, the background service is configured to start with 106-3, then 106-2, and then 106-1. For example, FIG. 2B illustrates an example where the in-line tool 110 applies value D2 to the instance message 106-1 while the background service 112 applies the value D2 to the instance message 106-3.

Figure 2C:
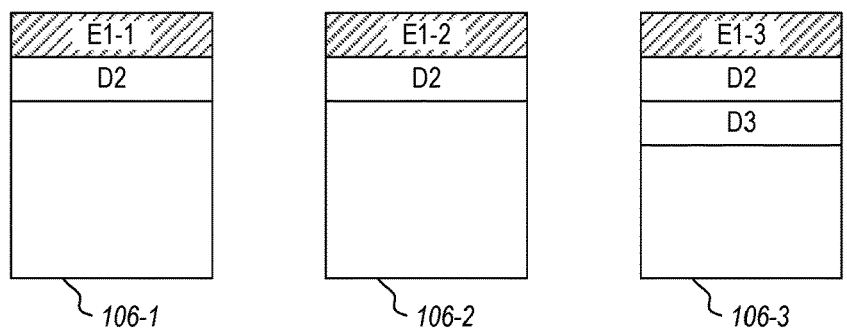
FIG. 2C illustrates instance messages being updated.
Figure 2D:
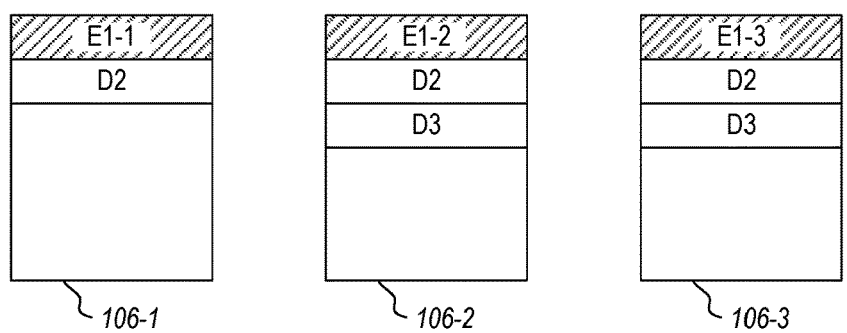
FIG. 2D illustrates instance messages being updated.

FIG. 2C illustrates an example where the in-line tool 110 has stopped applying updates for some reason. For example, perhaps the in-line tool 110 has encountered an error. In this example, the background service 112 applies the value D2 to the instance message 106-2. Since the command for applying the value D2 to the instance messages 106 has completed, the background service 112 starts executing the command(s) for applying the value D3 to the instance messages 106. In FIG. 2C, the value D3 is applied to the instance message 106-3 by the background service 112. FIG. 2D illustrates that the value D3 is then applied to the instance message 106-2 by the background service 112.

Propagation of values from the master message 104 to the instance messages 106-1, 106-2, and 106-3 may be performed in a number of different fashions. For example, in the examples illustrated in FIGS. 2A, 2B, 2C and 2D default values are propagated in a first instance when the instance messages have no pre-existing default values or corresponding exception values. Thus, FIGS. 2A, 2B, 2C and 2D illustrate examples where exception values E1-1, E1-2, and E1-3 exist superseding the default value D1. Other than the exception values E1-1, E1-2, and E1-3, the instance messages 106-1, 106-2, and 106-3 do not include, initially, any of the other default values D2, D3, D4, D5, and D6. FIGS. 2A, 2B, 2C and 2D illustrate initial application of the default values D2, D3, D4, D5, and D6. FIGS. 2A, 2B, 2C and 2D illustrate an example where default values are added one default value at a time to the instance messages.

Figure 3:
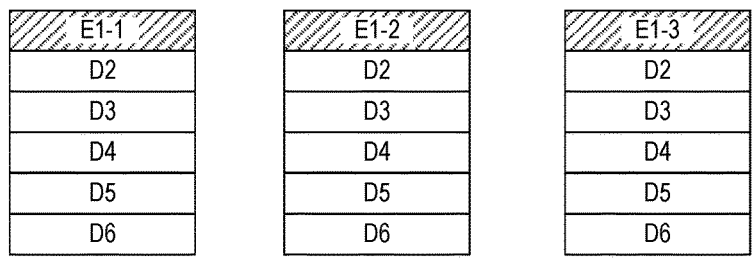
FIG. 3 illustrates instance messages being updated.

Alternatively, as illustrated in FIG. 3, when initially applying default values, embodiments could add all appropriate defaults to an instance message (i.e., default values for which there is not a superseding exception value) and then move to next instance message. In the example illustrated in FIG. 3, the in-line tool 110 applies default values D2, D3, D4, D5, and D6 to the instance message 106-1 while the background service 112 applies the default values D2, D3, D4, D5, and D6 to the instance message 106-3.

In yet an alternative embodiment, the default values D1, D2, D3, D4, D5, and D6 are applied to the instance messages 106-1, 106-2, and 106-3, as appropriate, when those messages are created and exception values E1-1, E1-2, and E1-3 can be applied to instance messages 106-1, 106-2, and 106-3 respectively later. Alternatively, the exception values E1-1, E1-2, and E1-3 can be applied to instance messages 106-1, 106-2, and 106-3 respectively, while the default values D2, D3, D4, D5, and D6 are applied during the creation process of the instance messages 106-1, 106-2, and 106-3.

Figure 4A:
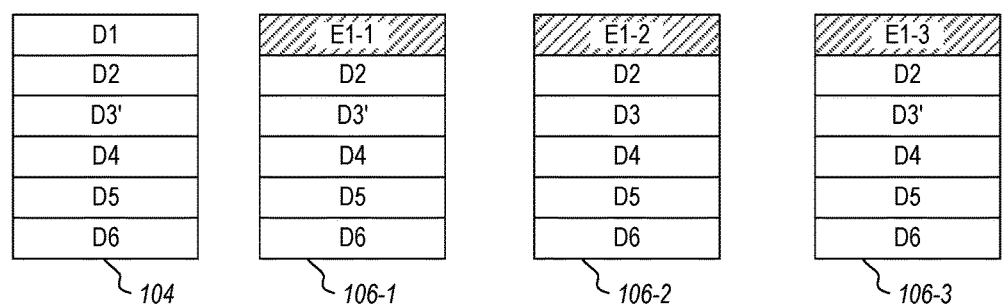
FIG. 4A illustrates instance messages being updated.
Figure 4B:
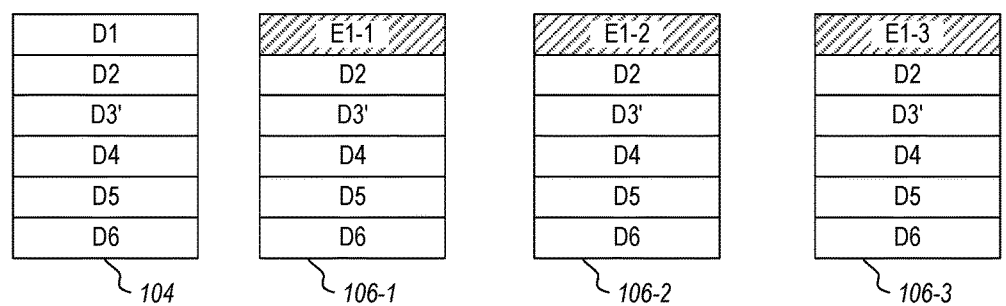
FIG. 4B illustrates instance messages being updated.

Once default values have been applied to the instance messages 106-1, 106-2, and 106-3 there may be a need to update a default value that should be applied to all messages. For example, FIG. 4A illustrates that default value D3 is updated to D3' in the master message 104. This change is propagated to the instance messages in a fashion as illustrated above. For example, in FIG. 4A, the in-line tool 110 (from FIG. 2A) is used to update the instance message 106-1 while the background service 112 is used to update the instance message 106-3. FIG. 4B illustrates completion of updating all instance messages 106-1, 106-2 and 106-3 by using the in-line tool 110 and/or the background service 112.

Notably, however, updating the default value D3 to D3' does not result in an overwrite of the exception values E1-1, E1-2, and E1-3 as would normally occur in some legacy systems.

The following now illustrates additional details related to a framework in which embodiments may be implemented. In particular, the following illustrates an example of a modern system that is configured to natively implement non-patter recurrence messages but to still allow legacy clients to also use such functionality using their legacy mechanisms.

In some embodiments, the messages are email messages. For example, in some embodiments, a string of emails may exist. In some legacy systems, hashtags for a string of emails, or social media "likes" of the string of emails may be able to be added to the entire string. However, to remove a "like" or a hashtag from an individual message in the string, embodiments can create an exception that indicates the removal of the "like" or hashtag. The exception can be propagated as appropriate to an instance message while maintaining other default values.

The following illustrates an example of how ordered messages may be delivered.

Figure 5:
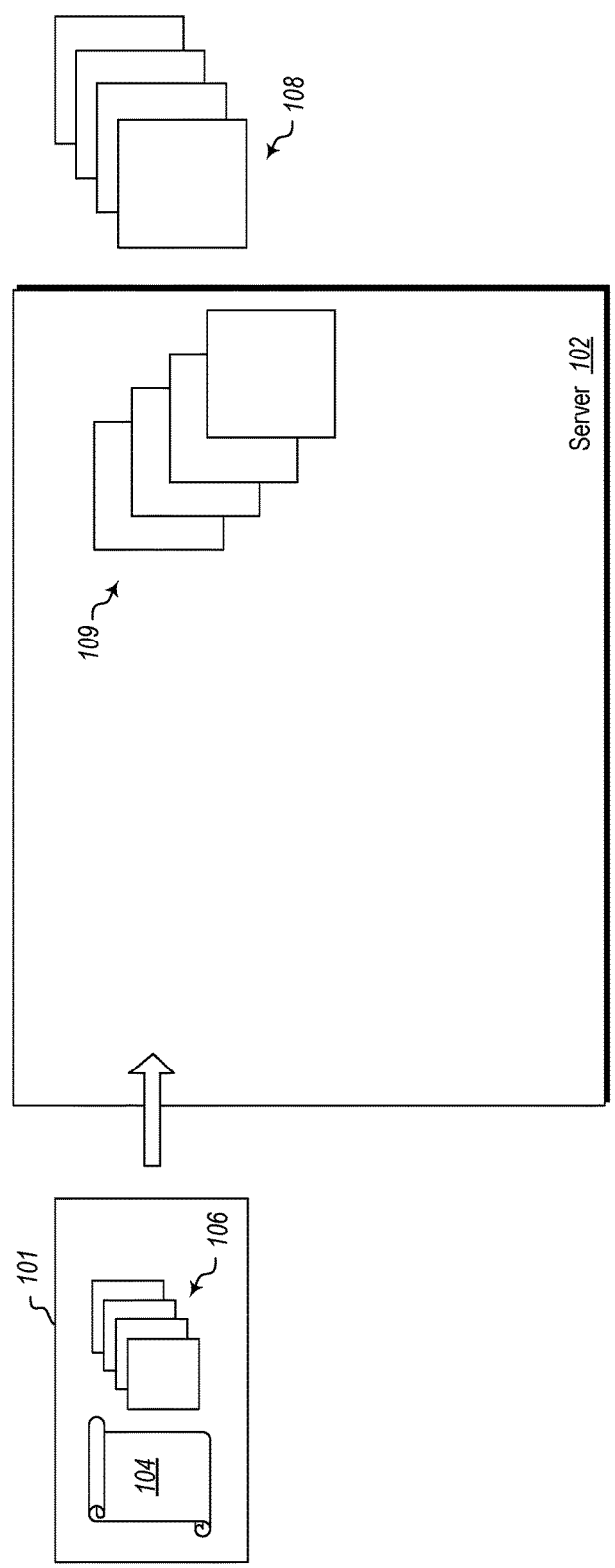
FIG. 5 illustrates an email server configured to order messages.

Some embodiments described herein implement a system for ordering a series of messages when the messages in the series of messages may be received out of order. That is, embodiments can address issues where there is no guarantee that messages will be received in order. Embodiments can accomplish this functionality by using a master message for a series of instance messages where the master message identifies the order for the instance messages in the series of instance messages. For example, FIG. 5 illustrates a server 102. The server comprises a set of mailboxes 109 for clients 108. The server 102 may receive a series of messages 101. The series of messages 101 includes a master message 104 and a plurality of instance messages 106. The instance messages 106 may be ordered messages that have a particular order to them. The master message 104 includes information identifying the order of the messages in the series of messages 101.

Figure 6:
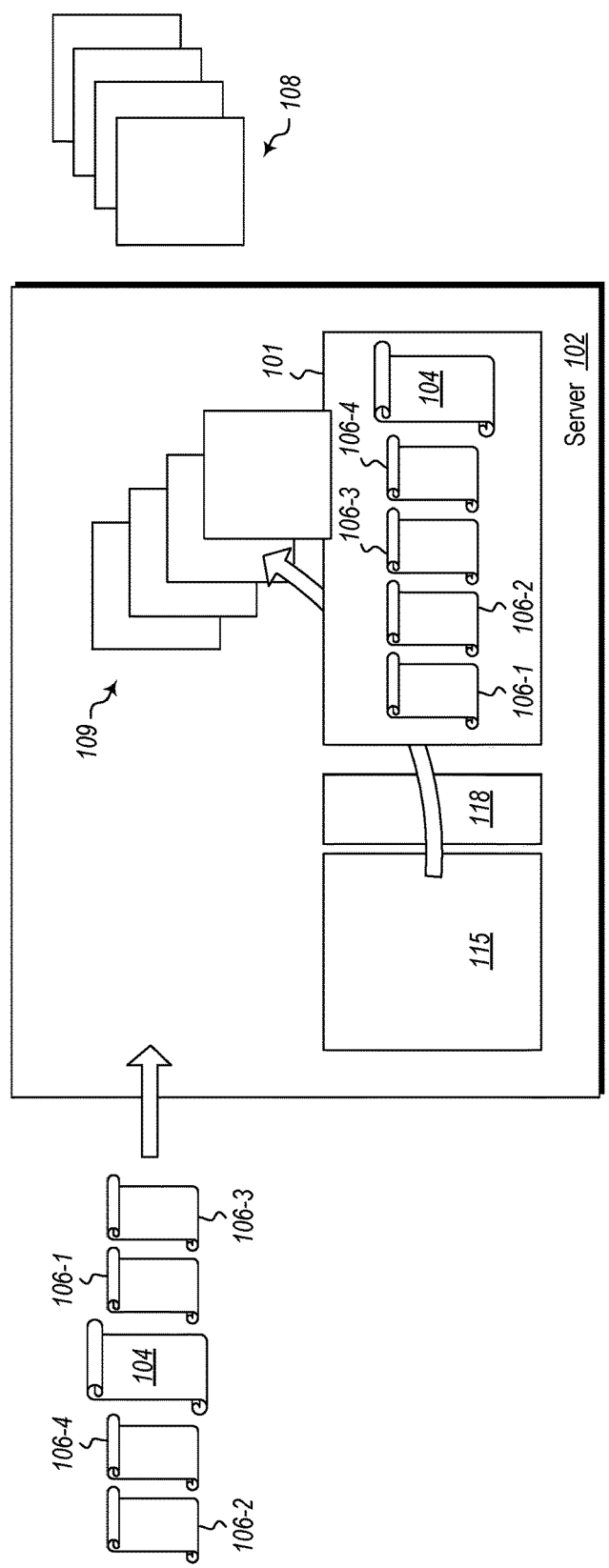
FIG. 6 illustrates additional details of the email server configured to order messages.
Figure 7A:
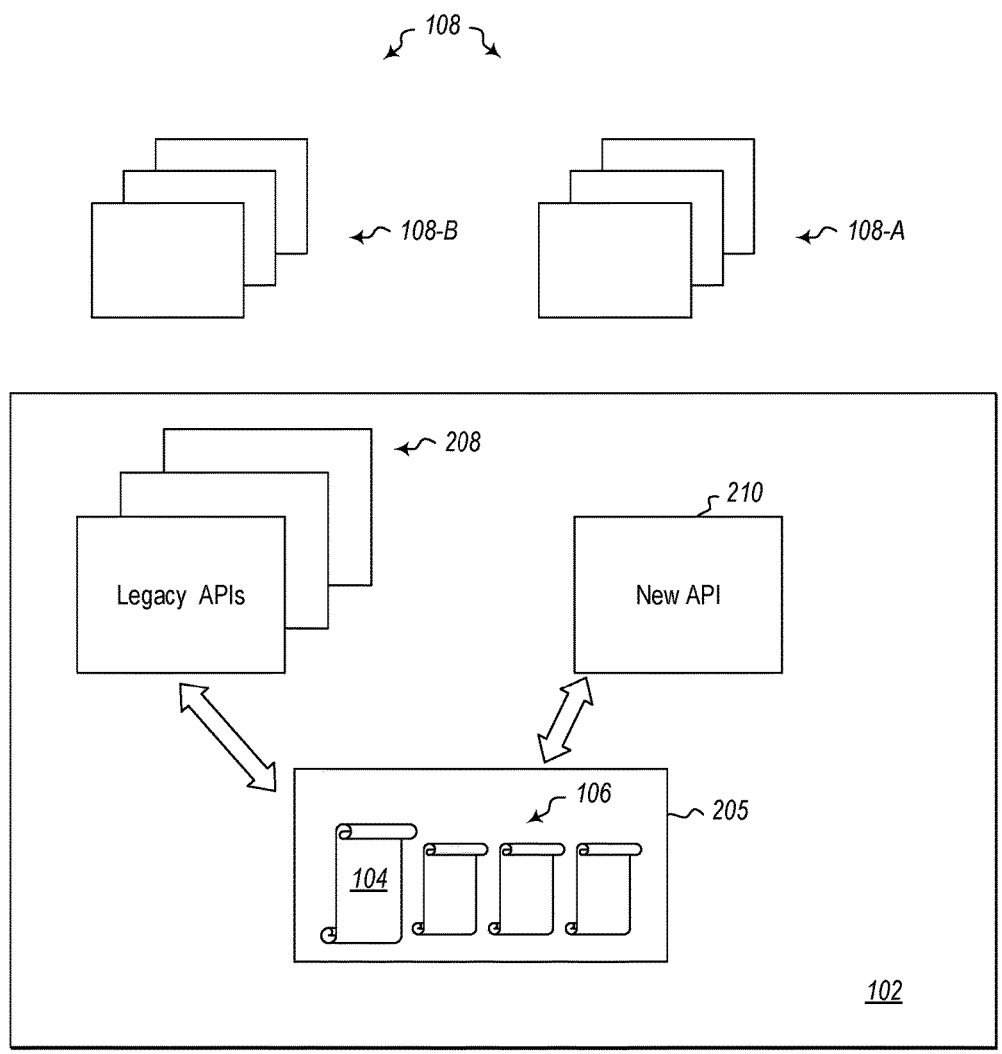
FIG. 7A illustrates a modern server that facilitates legacy clients.
Figure 7B:
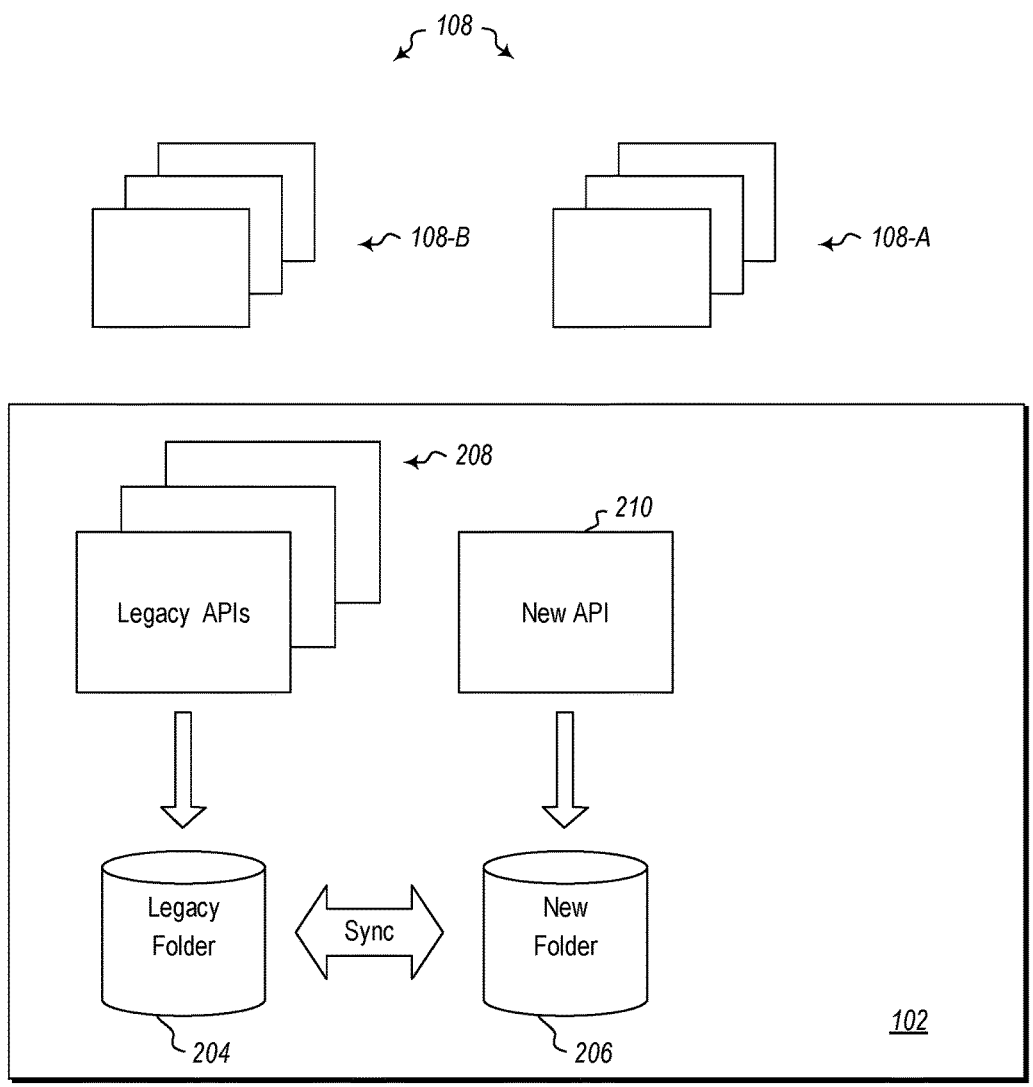
FIG. 7B illustrates a modern server that facilitates legacy clients.

However, as illustrated in FIG. 6, messages in the series of messages 101 may be received out of order. FIG. 6 illustrates that message 106-3 is received, followed by message 106-1, followed by the master message 104, followed by message 106-4, followed by message 106-2. Thus, the master message 104 may be received by a system after one or more of the other instance messages in the series of messages 106.

To address this, embodiments may store instance messages 106 in a series of messages in a temporary storage container 115 such as a temporary mailbox. The instance messages 106 in the series of instance messages may be stored in the temporary storage container until the master message 104 is received. Once the master message 104 is received, the master message 104 can be used to order other instance messages in the series of messages 101. Once the instance messages 106 have been ordered, they can be provided to the user. This may be done, for example by sending the series of messages 101 to the mailboxes 109 where they can be accessed by the clients 108.

In some embodiments, the temporary storage container 115 may not be accessible to a user (e.g., the clients 108 may not be able to access the temporary storage container 115). However, in some embodiments, the temporary storage container 115 may be available to the user, but the user is made aware that the instance messages are ordered instance messages and that there is not currently sufficient ordering context, i.e., the master message 104 has not yet been received, for the instance messages 106 in the set of instance messages to be properly ordered.

For example, the temporary storage container 115 may be on a mail server, and may include an additional set of mailboxes for clients 108. However, mailboxes in the temporary storage container 115, while accessible by clients, would be known to have incomplete information. Users at each the clients 108 could access a corresponding mailbox for the client in the temporary storage containers 115.

Ordering the instance messages can be done in a number of different ways. In some embodiments, using the master message 104, an ordering tool 118 can identify whether or not all of the instance messages in the series of instance messages 101 have been received. Once all instance messages are received, the series of instance messages 101 can be released to a user. This may be done by providing all of the instance messages in the series of instance messages, in their correct order, to a user repository, such as a user mailbox (for example, the mailboxes 109) or other repository. Alternatively, the instance messages may be provided one at a time to the user according to the order specified in the master message.

In an alternative embodiment, the master message 104 may be used by an ordering tool 118, which may be a data processing service at the server 102, to provide instance messages in the series of instance messages to a user, such as for example to a mailbox or other repository at the server accessible to the client, as soon as they are in order to be provided to a user. For example, some embodiments may be implemented where all instance messages must be received in order. In such a system, once the master message arrives at the system, there are at least two different scenarios that may occur.

In the first scenario, the first instance message in the series, and potentially a set of one or more immediately subsequently ordered instance messages (i.e., there are no intervening instance messages that have not yet been received in the set of one or more immediately subsequently ordered instance messages), may already have arrived at the system. In this case, the system can move the first instance messages and the set of one or more immediately subsequently ordered instance messages (to the extent that the set exists) to a user mailbox accessible by the user at a client. However, if one or more instance message are missing in the series, any already received instance messages that should be ordered after the missing instance messages will not be moved to the mailbox until the missing instance messages are received at the system. Thus, an instance message is only provided to users for access when all other instance messages ordered before the instance message have been sent.

In the second scenario, while other instance messages may have been received, the first instance message in the series has not been received by the system. Thus, the system will wait until the first instance message, as identified in the master message 104, has been received before moving the instance messages to the mailbox. Once the first instance message has been received, sending instance messages to the user can proceed as described above in the first scenario.

In an alternative embodiment, no instance messages are provided to the user until all instance messages in the series can be provided to the user in the appropriate order. In this scenario, in the particular example illustrated in FIG. 6, the master message 104 and all instance messages in the series of messages 101 are moved from the temporary storage container 115 to the mailboxes 109 as a group, in order, so that the clients 108 have access to all of the messages in the series of messages 101 together in order or none of the messages in the series of messages 101. Note that each client has a corresponding mailbox. Thus, a copy of the series of messages 101 will be placed in each mailbox for each client.

Some embodiments may be practiced in an environment where a system attempts to accommodate non-pattern recurrence (NRP) for calendar meeting messages. Non-pattern recurrence is explained in more detail below. However, briefly, non-pattern recurrence is related to the ability for some modern systems to accommodate calendar items which allow advanced scheduling features, such as the ability to have exceptions for appointments in a series of appointments, modify individual appointments in a series of appointments, add additional appointment instances to a series of appointments, collaborate on appointment details, etc. In some situations a server may have this functionality enabled and modern clients can make use of the functionality while legacy clients and/or other legacy servers are unable to make use of the functionality.

One solution that has been developed is to create a new message for every instance in a series of calendar meeting messages. This results in a series of messages which includes N+1 messages (e.g., the master message 104 and the series messages 106) sent to attendees of the meetings for the series of calendar meeting messages. As discussed above (and as discussed below for non-pattern recurrence), for maintenance of temporal context, there may be a need for a certain order for the calendar meeting messages to arrive at an attendee end to provide a seamless user experience. Attendees that are able (by virtue of using a modern client that uses a modern calendar API) interact only with series level messages (e.g., the master message 104) without needing to be presented with instance messages (e.g., instance messages 106).

However, as illustrated above a mechanism is implemented that detects that messages for a series operation are coming out of order and can hold up instance messages and deliver them after a series master message is delivered. The messages are parked in a spare location, such as a separate folder, which is typically (although not always) not visible to the user. Once the master message arrives, these parked messages are released and delivered to the mailboxes.

The following now illustrates additional details related to a framework in which embodiments may be implemented. In particular, the following illustrates an example of a modern system that is configured to natively implement non-pattern recurrence messages but to still allow legacy clients to also use such functionality using their legacy mechanisms.

Embodiments may be implemented in a framework where there is a creation of a series of meetings that does not have a recurrence pattern. Unless explicitly stated, anything that applies to a traditional recurring series applies here as well. For example, an organizer should be able to: add an attendee to all instances; add an attendee only to one instance; cancel the whole series; cancel only one instance in the series; set the location for the whole series; change the location only in one instance; etc.

Conversely, in the illustrated example, operations that are not allowed on a recurring series (like adding an existing meeting to a series) will not be allowed here. One exception to this rule is the ability to have multiple instances on the same day (which is not currently allowed for a recurring series).

Using the functionality set forth herein, legacy clients will be able to see all instances of the series without changing their implementation. However, in the illustrated examples, they will be seen as individual appointments because in some legacy schema, it is not possible to represent such instances as a single appointment.

Referring now to FIG. 4A, an example is illustrated which illustrates a single calendar folder 205. Both modern clients 108-A and legacy clients 108-B connect to this folder 205 on the server 102. But for legacy APIs 208 used by legacy clients, the server 102 hide the series master 104. The legacy clients can see the instance messages, where they can get default information and exception information on an event by event basis. Modern clients 108-A, using the new API can see both the series master 104 to obtain default information for the entire series of events and the instance messages 106 to obtain exception information for each event.

Referring now to FIG. 4B, an alternative example is illustrates which illustrates a server 102 is illustrated with two calendar folders. A first legacy calendar folder 204 for legacy clients using legacy APIs 208 and a second new calendar folder 206 is for clients that use a new API 210.

The legacy calendar folder 204 continues to store items according to a legacy schema in a way that legacy clients can understand the items. For example, for legacy clients that do not understand non-pattern recurrences, these items will be stored as single items (such as the instance messages 106) instead of as part of a non-pattern recurrence series (such as the master message 104). The legacy calendar folder 204 will remain visible to legacy clients 108-B and they will interact with it in the same way that they have previously interacted with the legacy calendar folder 204.

The legacy calendar folder 204 will not be visible to modern clients 108-A, and the modern clients 108-A will not communicate with the legacy calendar folder 204. Instead, the modern clients 108-A will use the new calendar folder 206 with a new schema. This folder is not visible to the legacy clients 108-B (since it will contain items stored in a different way, which would not be understood by legacy protocols). It will only be accessible through the new API 210 and not through legacy APIs 208. Therefore, any details of how data is represented will be completely abstracted from clients. For example, non-pattern recurrences will be stored with a representation that has all the desired semantics and that will be exposed via the new API 210.

A sync mechanism to keep data updated on both folders may be implemented.

The following illustrates details regarding storing a non-pattern recurrence. Previously, a recurring series in a legacy system, such as a legacy Exchange Server from Microsoft Corporation of Redmond, Wash. has a top-level master which has information about the recurrence pattern, exceptions and is also used to represent the first instance of the series.

In contrast, a modern system may include an object (e.g., the master message 104) solely responsible for representing the non-pattern recurrence. It holds the following pieces of data:

The properties that are common to all instances (unless they are exceptions of course);
Information about when the series starts and when the series ends; and
A link to the instances of the non-pattern recurrence.

A difference between the non-pattern recurrence master and the "traditional recurring series" master is that this item is just metadata and only meant to be consumed by a modern server, such as a modern Exchange server available from Microsoft Corporation of Redmond, Wash. (and therefore it isn't visible to clients, modern or legacy). For example, FIG. 8 illustrates a representation of a non-pattern recurrence with instances 216-1, 216-2, and 216-3 on Monday, Wednesday and Thursday respectively. Only these items are visible to client. In some embodiments, during a calendar view embodiments internally query for both instance messages 106 and master messages 104 and then merge data from the master message 106 with instance data to get the latest state of the instance (in case background propagation has not yet caught up). At this point only instances are returned from calendar view API call.

Note that the item 212 holding the metadata begins on the same day of the first instance and ends at the last day. This allows for a more efficient query when obtaining a calendar view.

On legacy systems, when a client requests a view, two queries are made to the server 102: one for single and one for recurring items. Single item retrieval is simple: the legacy system can simply request the items that are in the desired window based on their start and end dates. When recurring items are in the picture, however, the server 102 has to examine the entire calendar and filter items in memory. This is because data for the series master also doubles as the first item—and therefore may be outside of the query window.

In contrast, in the non-pattern recurrence model, this is resolved by having the data related to the start and end of the series in the item 212 that represents the series. Since it stretches and shrinks with the instances, it is always in the same window as the instances 216-1, 216-2 and 216-3. This detail allows modern systems to have one single query and have every object of interest returned by it with no need to filter anything in memory.

As explained above, in one alternative embodiment, there are two calendar folders (i.e., a legacy calendar folder 204 and a new calendar folder 206), accessed by different clients (i.e., legacy clients 108-B and modern clients 108-A respectively). The two calendar folders have the same data (but represented in different ways as appropriate for the different clients).

Each time a modern client writes to the new calendar folder 206, an equivalent operation is executed against the legacy calendar folder 204 (and vice-versa). As each folder has a different data model, an operation cannot be simply replayed. Instead, there is a translation into equivalent operations.

For instance, assume that, in the new model, exceptions of a recurring series are treated like top-level partial items (like in non-pattern recurrences) and that a legacy API (from among the legacy APIs 208) is creating an exception.

Conversely, if a new API 210 (which operates against the new folder 206) had created the partial item for the recurring series exception, synchronization operations would have to update the corresponding item on the legacy folder by creating an attachment.

Thus, after each create/update/delete operation, embodiments will take the object as a whole and fully update the equivalent object on the other folder.

Instances of non-pattern recurrences are full items and contain all data required for them to be displayed. This includes series information that will be used only by the modern clients 108-A and all the properties expected by legacy clients 108-B.

To guarantee the backwards compatibility, data that would be only in the master message 104 is propagated to all the instance messages 106 as illustrated above.

Creating or modifying a non-pattern recurrence as a series is done through the new API 210. In this scenario, embodiments are aware of series versus exceptions and perform bulk updates whenever appropriated. There will be a master item, which will only be understood by the new API. MAPI clients will not see it at all.

Thus, for backwards compatibility, each instance of a series will have all the properties necessary to display the item as a single item. Changes to the series as a whole (like changing the subject for all instances) will be written against the master message. Embodiments will attempt to update the other instances inline with the save. Updates that cannot be performed online (either because of failures, because there are too many instances, or for other reasons) will be done in the background process.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
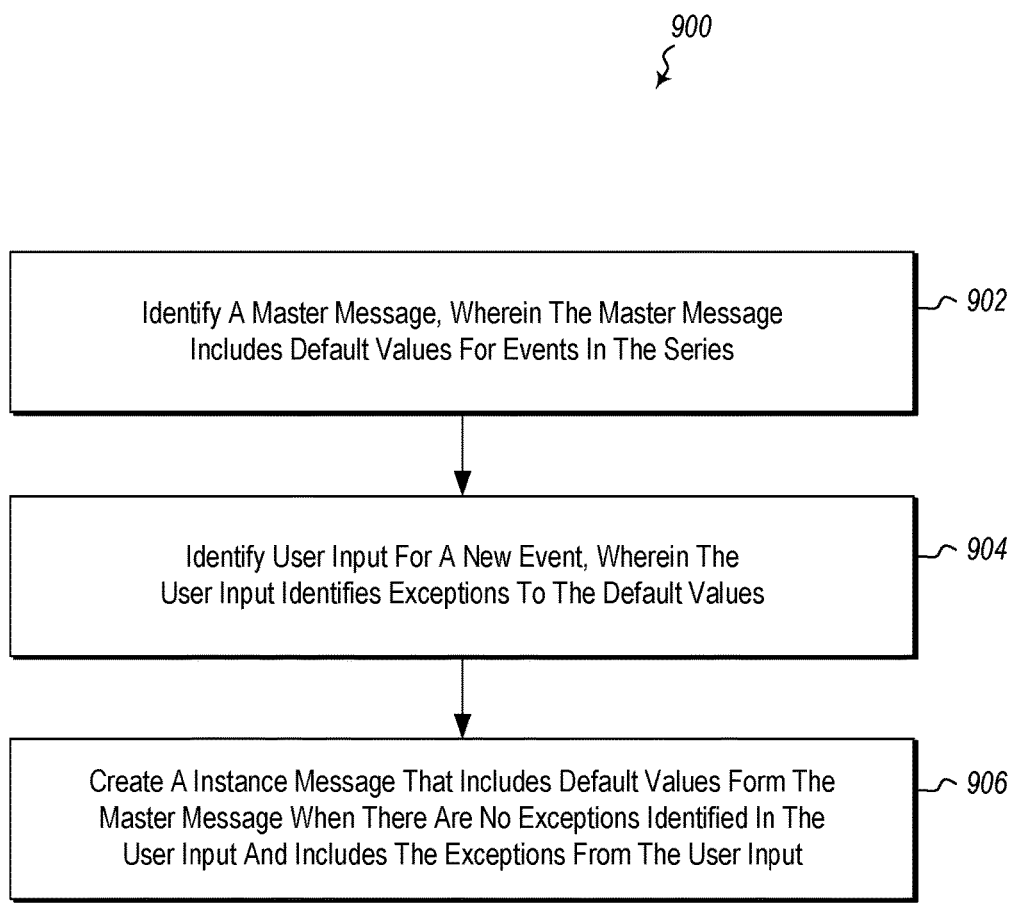
FIG. 9 illustrates a method for adding an instance in a series in a fashion that preserves the series for both modern and legacy systems.

Referring now to FIG. 9, a method 900 is illustrated. The method 900 may be practiced in a computing environment including a series of events. The method 900 includes acts for changing an instance in the series in a fashion that preserves the series for both modern and legacy systems, even in cases where the change would not ordinarily be compatible with legacy systems. The method includes identifying a master message, wherein the master message includes default values for events in the series (act 902). Thus for example, the server 102 may identify the master message 104 which includes default values D1, D2, D3, D4, D5, and D6.

The method 900 further includes identifying user input for a new event in the series, wherein the user input identifies one or more exceptions to the default values. For example, as illustrated in FIG. 1A, the server 102 may receive the exception value E1 as a replacement for the default value D1 in a first instance event in a series of events (act 904).

The method 900 further includes creating an instance message that includes default values from the master message for default values where there are no exceptions identified to those default values in the user input and includes the exceptions from the user input (act 906). Thus, in the example illustrated in FIG. 1A, the server 102 creates the instance message 106-5 which includes the default values D2, D3, D4, D5, and D6 because there are no exceptions identified for those values in the user input in the user change message 116-1. However, the server includes the exception value E1 in place of the default value D1 as this exception value is identified in the user input in the user change message 116-1.

In some embodiments, creating the instance message is performed as a result of identifying that the exceptions would not be allowed on the legacy system. Thus, for example, in the explanation of FIG. 1A above, it was indicated that the exception information 113 is not readable by legacy systems. However, there may be examples where certain portions of the exception information is, in-fact, readable by legacy systems and can be used by those legacy systems. Some embodiments may recognize this fact that certain exceptions are allowed and accommodated by legacy systems. In such cases, there may be no need to create an exception message. Thus, systems can configured to create exception messages when exceptions would not be allowed on particular legacy systems and when such exceptions are identified.

Thus, in some embodiments, the method may further include receiving additional exceptions for an instance where the additional exceptions would be allowed by a legacy system, and as a result updating the master message instead of creating a new instance message.

In some embodiments, the instance message may include information identifying which parts of the instance message are exceptional. In particular, the instance message 106-5 may include metadata indicating that the value E1 is an exception value and not a default value. This can be used to quickly identify exceptional values in instance messages. In some embodiments, this may be used to quickly identify exceptions for cases where the master message 104 includes exceptions by reference using pointers to the instance messages.

The method 900 may further include, as a result of creating the instance message, sending the instance message to other entities associated with the series of events. Thus for example, the instance message may be sent to each of the clients 108, where users at the clients 108 are interested in the series of events.

The method 900 may further include identifying additional user input to other events in the series; determining that the other user input in combination with the user input for a new event in the series would be allowed on the legacy system; and as a result, updating the master message to reflect the additional user input and the user input for a new event in the series as a series operation. Thus for example, FIG. 1A illustrates where instance messages 106-2 and 106-3 include the value D1. If the complete set of instance messages includes messages 106-5, 106-2 and 106-3, and user input is received updating D1 to E1 for messages 106-2 and 106-3, then the master message 104 can simply update the value D1 to be E1 as a default value for all events in the series of events. In some such embodiments, the method 900 may include, as a result, discarding the instance messages 106-5, 106-2 and 106-3.

Figure 10:
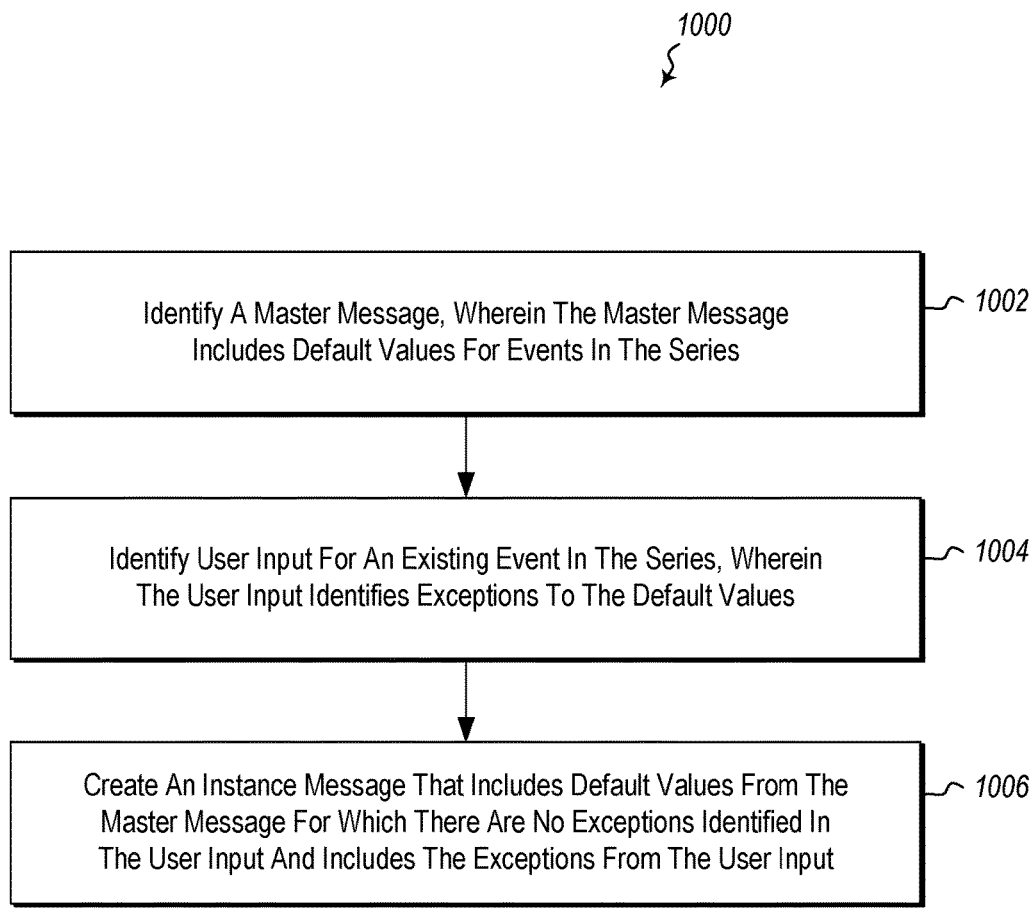
FIG. 10 illustrates a method for changing an instance in a series in a fashion that preserves the series for both modern and legacy systems.

Referring now to FIG. 10, a method 1000 is illustrated. The method 1000 may be practiced in a computing environment including a series of events. The method 1000 includes acts for changing an instance in the series in a fashion that preserves the series for both modern and legacy systems, even in cases where the change would not ordinarily be compatible with legacy systems. The method includes identifying a master message, wherein the master message includes default values for events in the series (act 1002). Thus for example, the server 102 may identify the master message 104 which includes default values D1, D2, D3, D4, D5, and D6.

The method 1000 further includes identifying user input for an existing event in the series, wherein the user input identifies one or more exceptions to the default values. For example, as illustrated in FIG. 1A, the server 102 may receive the exception value E1-1 as a replacement for the default value D1 in a first instance event in a series of events (act 1004).

The method 1000 further includes creating an instance message that includes default values from the master message for default values where there are no exceptions identified to those default values in the user input and includes the exceptions from the user input (act 1006). Thus, in the example illustrated in FIG. 1A, the server 102 creates the instance message 106-1 which includes the default values D2, D3, D4, D5, and D6 because there are no exceptions identified for those values in the user input in the user change message 116-1. However, the server includes the exception value E1-1 in place of the default value D1 as this exception value is identified in the user input in the user change message 116-1.

In some embodiments, creating the instance message is performed as a result of identifying that the exceptions would not be allowed on the legacy system. Thus, for example, in the explanation of FIG. 1A above, it was indicated that the exception information 113 is not readable by legacy systems. However, there may be examples where certain portions of the exception information is, in-fact, readable by legacy systems and can be used by those legacy systems. Some embodiments may recognize this fact that certain exceptions are allowed and accommodated by legacy systems. In such cases, there may be no need to create an exception message. Thus, systems can configured to create exception messages when exceptions would not be allowed on particular legacy systems and when such exceptions are identified.

Thus, in some embodiments, the method may further include receiving additional exceptions for an instance where the additional exceptions would be allowed by a legacy system, and as a result updating the master message instead of creating a new instance message.

In some embodiments, the instance message may include information identifying which parts of the instance message are exceptional. In particular, the instance message 106-1 may include metadata indicating that the value E1-1 is an exception value and not a default value. This can be used to quickly identify exceptional values in instance messages. In some embodiments, this may be used to quickly identify exceptions for cases where the master message 104 includes exceptions by reference using pointers to the instance messages.

The method 1000 may further include, as a result of creating the instance message, sending the instance message to other entities associated with the series of events. Thus for example, the instance message may be sent to each of the clients 108, where users at the clients 108 are interested in the series of events.

The method 1000 may further include identifying additional user input to other events in the series; determining that the other user input in combination with the user input for an existing event in the series would be allowed on the legacy system; and as a result, updating the master message to reflect the additional user input and the user input for an existing event in the series as a series operation. Thus for example, FIG. 1A illustrates where instance messages 106-2 and 106-3 include the value D1. If the complete set of instance messages includes messages 106-1, 106-2 and 106-3, and user input is received updating D1 to E1-1 for messages 106-2 and 106-3, then the master message 104 can simply update the value D1 to be E1-1 as a default value for all events in the series of events. In some such embodiments, the method 1000 may include, as a result, discarding the instance messages 106-1, 106-2 and 106-3.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
one or more processors; and
one or more computer-readable storage media having stored thereon computer-executable instructions that are executable by the one or more processors to cause the system to share a series of calendar events to a second system, the sharing of the series of calendar events comprises at least the following:
identify a master message that includes default values for the series of calendar events in a temporal order;
identify a first user input for adding a new event in the series of events, the first user input identifying exceptions to the default values;
identify that whether the exceptions to the default values would be compatible with the second system;
as a result of identifying that the exceptions would not be compatible with the second system,
create an instance message for use at the second system that includes the series of calendar events that has default values from the master message for which there are no exceptions identified in the first user input and includes the new event to which the exceptions from the first user input applied, such that the instance message being capable of being displayed at the second system as a discrete event decoupled from the series of events; and
send the instance message to the second system for display;
as a result of identifying that the exceptions would be compatible with the second system,
modify the master message to include the exceptions to the default values; and
send the modified master message to the second system for display.

2. The system of claim 1, wherein the instance message includes information identifying which parts of the instance message are exceptional.

3. The system of claim 1, wherein the computer-executable instructions are also executable by the one or more processors to cause the system to, as a result of creating the instance message, send the instance message to other entities associated with the temporal series.

4. The system of claim 1, wherein the computer-executable instructions are also executable by the one or more processors to cause the system to:
identify additional user input to other events in the temporal series of events;
determine that the additional user input in combination with the first user input would be allowed on the legacy system; and
as a result of the determination, update the master message to reflect the additional user input and the first user input as a series operation.

5. The system of claim 4, wherein the computer-executable instructions are also executable by the one or more processors to cause the system to, as a result of the determination, discard the instance message.

6. The system of claim 1, wherein the computer-executable instructions are also executable by the one or more processors to cause the system to, as a result of receiving second user input for an addition to the temporal series of events that is allowed on the legacy system, update the master message and the instance message.

7. The system of claim 1, wherein the legacy system comprises a legacy event calendaring system and the one or more modern systems comprise one or more modern event calendaring systems.

8. A method, implemented at a computer system that includes one or more processors, for sharing a series of events to a second system, the method comprising:
  identifying a master message that includes default values for the series of calendar events in the temporal order;
  identifying a first user input for adding a new event in the series of events, the first user input identifying exceptions to the default values;
  identifying that whether the exceptions to the default values would be compatible with the second system;
  as a result of identifying that the exceptions would not be compatible with the second system,
    creating an instance message for use at the second system that includes the series of calendar events that has default values from the master message for which there are no exceptions identified in the first user input and includes the new event to which the exceptions from the first user input applied, such that the instance message being capable of being displayed at the second system as a discrete event decoupled from the series of events; and
    send the instance message to the second system for display;
  as a result of identifying that the exceptions would be compatible with the second system,
    modifying the master message to include the exceptions to the default values; and
    sending the modified master message to the second system for display.

9. The method of claim 8, wherein the instance message includes information identifying which parts of the instance message are exceptional.

10. The method of claim 8, further comprising, as a result of creating the instance message, sending the instance message to other entities associated with the temporal series.

11. The method of claim 8, further comprising:
  identifying additional user input to other events in the temporal series of events;
  determining that the additional user input in combination with the first user input would be allowed on the legacy event calendaring system; and
  as a result of the determination, updating the master message to reflect the additional user input and the first user input as a series operation.

12. The method of claim 11, further comprising, as a result of the determination, discarding the instance message.

13. The method of claim 8, further comprising, as a result of receiving second user input for an addition to the temporal series of events that is allowed on the legacy system, updating the master message and the instance message.

14. A computer program product comprising one or more hardware storage devices having stored thereon computer-executable instructions that are executable by one or more processors to cause a system to perform at least the following:
  identify a master message that includes default values for a series of calendar events in a temporal order;
  identify a first user input for adding a new event in the series of events, the first user input identifying exceptions to the default values;
  identify that whether the exceptions to the default values would be compatible with a second system;
  as a result of identifying that the exceptions would not be compatible with the second system,
    create an instance message for use at the second system that includes the series of calendar events that has default values from the master message for which there are no exceptions identified in the first user input and includes the new event to which the exceptions from the first user input applied, such that the instance message being capable of being displayed at the second system as a discrete event decoupled from the series of events; and
    send the instance message to the second system for display;
  as a result of identifying that the exceptions would be compatible with the second system,
    modify the master message to include the exceptions to the default values; and
    send the modified master message to the second system for display.

15. The computer program product of claim 14, wherein the instance message includes information identifying which parts of the instance message are exceptional.

16. The computer program product of claim 14, wherein the computer-executable instructions are also executable by the one or more processors to cause the system to, as a result of creating the instance message, send the instance message to other entities associated with the temporal series.

17. The computer program product of claim 14, wherein the computer-executable instructions are also executable by the one or more processors to cause the system to:
  identify additional user input to other events in the temporal series of events;
  determine that the additional user input in combination with the first user input would be allowed on the legacy system; and
  as a result of the determination, update the master message to reflect the additional user input and the first user input as a series operation.

18. The computer program product of claim 17, wherein the computer-executable instructions are also executable by the one or more processors to cause the system to, as a result of the determination, discard the instance message.

19. The computer program product of claim 14, wherein the computer-executable instructions are also executable by the one or more processors to cause the system to, as a result of receiving second user input for an addition to the temporal series of events that is allowed on the legacy system, update the master message and the instance message.

20. The computer program product of claim 14, wherein the legacy system comprises a legacy event calendaring system and the one or more modern systems comprise one or more modern event calendaring systems.

\* \* \* \* \*